United States Patent [19]

Karino et al.

[11] 4,396,698

[45] Aug. 2, 1983

[54] LOADED POLYMER LATEX DYE MORDANT COMPOSITION

[75] Inventors: Yukio Karino; Masakazu Morigaki; Shinji Sakaguchi, all of Minami-ashigara, Japan

[73] Assignee: Fuji Photo Film Co., Ltd., Kanagawa, Japan

[21] Appl. No.: 386,380

[22] Filed: Jun. 8, 1982

[30] Foreign Application Priority Data

Jun. 8, 1981 [JP] Japan .................................. 56-87943

[51] Int. Cl.³ .......................... G03C 1/40; G03C 5/54; G03C 7/00; C08L 61/20

[52] U.S. Cl. .................................... 430/213; 430/216; 430/222; 430/372; 430/551; 430/941; 524/169; 524/222; 524/248; 524/330; 524/340; 524/341

[58] Field of Search ............... 430/213, 215, 216, 222, 430/372, 551, 627, 941, 545; 8/467; 260/29.2 N, 29.6 TA, 29.6 MN, 29.6 ME, 29.7 W, 29.7 NE, 29.7 E, 29 NR, 29.7 H, 29.7 T

[56] References Cited

U.S. PATENT DOCUMENTS

| | | | |
|---|---|---|---|
| 3,958,995 | 5/1976 | Campbell et al. | 430/213 |
| 4,131,469 | 12/1978 | Miyazako et al. | 430/213 |
| 4,203,716 | 5/1980 | Chen | 430/545 |
| 4,368,258 | 1/1983 | Fujiwhara et al. | 430/222 |

OTHER PUBLICATIONS

"Photographic Processes and Products", *Research Disclosure,* No. 1516, 11/1976, pp. 76–87.

*Primary Examiner*—Richard L. Schilling
*Attorney, Agent, or Firm*—Sughrue, Mion, Zinn, Macpeak & Seas

[57] ABSTRACT

A loaded polymer latex composition is disclosed. The composition comprises an aqueous polymer latex whose dispersed phase is made up of a specified cross-linked quaternary salt polymer loaded with a specified hydrophobic substance. The latex composition can be advantageously employed as a mordant polymer in a photographic element for a color diffusion transfer process. Use of the latex improves light resistance without lowering the maximum densities of the film images.

13 Claims, No Drawings

LOADED POLYMER LATEX DYE MORDANT COMPOSITION

FIELD OF THE INVENTION

The present invention relates to a photographic material for a color diffusion transfer process and, more particularly, to a novel method for enhancing the stability to light (which is described as "light resistance" hereinafter) of color images formed in a photographic material for the color diffusion transfer process.

A particular embodiment of the present invention relates to a novel composition containing both (a) a hydrophobic substance and (b) a polymer latex substance, and to process for preparing this composition. In accordance with the process, the hydrophobic substance is taken up by particles constituting the discontinuous phase or the dispersed phase of the latex. Another particular embodiment of the present invention relates to use of the above-described novel composition prepared according to the above-described process in the preparation of a covering composition, and to products covered with the above-described novel composition.

BACKGROUND OF THE INVENTION

A number of investigations have been carried out with respect to using various kinds of fading inhibitors in photographic systems for the color diffusion process with the intention of improving upon the light resistance of color images. For instance, *Research Disclosure,* Volume 151, Number 15162, from the lower part of the left column in page 81 to the upper part of the left column in page 82 (Nov. 1976) discloses the addition of various kinds of fading inhibitors to mordanting layers of photographic systems for the color diffusion process.

A large number of studies of mordants for fixing dyes in photographic materials for color diffusion transfer process have been undertaken. Specific examples of such mordants include vinylpyridine polymers and vinylpyridinium polymers disclosed in U.S. Pat. Nos. 2,548,564, 3,148,061, 3,756,814 and so on; water-soluble quaternary ammonium salt polymers disclosed in U.S. Pat. No. 3,709,690 and so on; water-insoluble mordants described in U.S. Pat. No. 3,898,088; water-dispersable latex mordants disclosed in U.S. Pat. No. 3,958,995 and so on; reactive mordants capable of being covalently bound to dyes disclosed in U.S. Pat. No. 4,168,976 and so on. Among these mordants, water-dispersable latex mordants which are difficult to move from the mordanting layers to other layers and which enable aqueous coating of the mordanting layers are especially suitable for the above-described purpose. Water-dispersable latex mordants are disclosed in Japanese Patent Application (OPI) Nos. 115228/79, 145529/79, 17352/81, 126027/79 and 155835/79 (the term "OPI" as used herein refers to a "published unexamined Japanese patent application") and U.S. Pat. No. 4,131,469, in addition to the above-described U.S. Pat. No. 3,958,995.

The above-described *Research Disclosure,* Number 15162 also describes water-dispersable latex mordants. However, it contains no mention of the method of adding fading inhibitors upon aqueous coating of mordanting layers containing these water-dispersable latex mordants. As for methods for adding fading inhibitors, when they are water-soluble ones, it is presumed that the method comprises adding directly to an aqueous coating solution because they are easily dissolved in the coating solution. When they are water-insoluble or slightly soluble ones, methods for adding such fading inhibitors to photographic elements include, judging from common sense, known techniques described below such as:

(1) a technique comprising dissolving the above-described fading inhibitor in a substantially water-insoluble high boiling point organic solvent [e.g., alkyl esters of phthalic acid (such as dibutyl phthalate, dioctyl phthalate, etc.), trimellitic acid esters (such as tri-t-octyltrimellitate, etc.), aromatic ethers, phosphoric acid esters (such as diphenyl phosphate, triphenyl phosphate, tricresyl phosphate, dioctylbutyl phosphate, etc.), citric acid esters (such as tributylacetylcitrate, etc.), alkylamides (such as N,N-diethyllaurylamide, etc.) or so on]. The resulting solution was emulsified and dispersed into a hydrophilic organic colloid aqueous solution (as described in, e.g., U.S. Pat. No. 2,322,027 and so on), (2) a technique of emulsifying and dispersing the fading inhibitor using water-insoluble high boiling point solvents in combination with assistant solvents (e.g., water-soluble solvents such as methanol, acetone, methyl cellosolve, etc., and substantially water-insoluble solvents such as ethyl acetate, butyl acetate, etc.) (which may be referred to U.S. Pat. Nos. 2,739,888 and 3,351,681, Japanese Patent Application (OPI) No. 59943/76 and so on), (3) a technique of emulsifying and dispersing the compound directly into a hydrophilic organic colloidal solution when the compound itself is oily matter at ordinary temperatures, (4) a technique comprising dissolving the compound into a water-soluble solvent (e.g., acetone, methyl cellosolve, methanol, ethanol or the like) and then dispersing the resulting solution directly into a hydrophilic organic colloidal coating solution, (5) a technique comprising dissolving the compound in a water-miscible organic solvent and thereto adding little by little an aqueous loadable latex to obtain a dispersion in which the compound is incorporated into the latex (as described in, e.g., Japanese Patent Application (OPI) No. 59943/76), and several techniques analogous thereto (as described in, e.g., Japanese Patent Application (OPI) Nos. 59942/76, 110247/79, 32552/79, 107941/79 and so on).

According to the above-described techniques (1) to (3), the size of dispersed particles in the dispersions obtained are generally within the range of about 0.1$\mu$ to about 2$\mu$. This causes a lowering of the maximum density due to a light scattering phenomenon, if the photographic element is in a wet state through photographic processings. In addition, since surface active agents used upon dispersion are carried in mordanting layers, a drop in the mordanting power of mordanting agents toward diffusible anionic dyes occurs. Moreover, techniques (1) and (2) are also disadvantageous because they tend to provide thick mordanting layers.

According to technique (4), the dispersion obtained contains large-size dispersed particles. Therefore, the maximum density is lowered and lumps come to the surface of the mordanting layer to spoil its surface properties.

According to the technique (5), the mordanting layer becomes thick. Furthermore, in many cases the surface of a loadable latex has an anionic character. This is because most loadable latexes have, as described in the above-described patent specifications, carboxyl groups, carboxylate groups, sulfo groups, sulfonate groups or sulfate groups, and anionic surface active agents are commonly used upon emulsion polymerization thereof. Therefore, mixing the loadable latex with cationic mordanting agent latexes causes coagulation. Even if surfaces of loadable latex particles are not anionic, a mixture of two or more of latexes is extremely unstable, and tends to produce coagulations.

Accordingly, development of novel methods for adding fading inhibitors to mordanting layers without lowering the maximum density have been desired.

Methods of dispersing hydrophobic compounds through the loading of aqueous latexes with the hydrophobic compounds have been disclosed in, e.g., Japanese Patent Application (OPI) Nos. 59942/76, 59943/76, 32552/79, 107941/79, 110247/79. Such dispersions have become feasible by the use of various techniques. However, the characteristic of these loadable aqueous latexes is that they substantially contain small fractions of monomer units having hydrophilic groups selected preferably from a group consisting of a carboxyl group, a carboxylate group, a sulfo group, a sulfonate group and a sulfate group. Therefore, such loadable latexes have no function except to act as media for dispersing hydrophobic substances effectively. Under these circumstances, the development of loaded polymer latex compositions with more functions imparted by loading polymer latexes and which have not only a dispersing function but also other functions with hydrophobic substances has been desired.

SUMMARY OF THE INVENTION

Therefore, a primary object of the present invention is to provide a photographic print for a color diffusion transfer process which has improved light resistance.

A second object of the present invention is to provide a photographic element for a color diffusion transfer process having a mordanting layer which contains a compound that exhibits a great effect upon the prevention of light discoloration and that retains such effect for a long time.

A third object of the present invention is to provide a novel method for incorporating a light discoloration inhibitor into a mordanting layer with high stability and without the typically accompanying defects.

Another object of the present invention is to provide a polymer latex dispersed finely by loading the latex with a hydrophobic substance without applying high energy thereto.

A further object of the present invention is to provide a quaternary ammonium (or phosphonium) salt polymer latex loaded with a hydrophobic substance as well as products using said latex.

It has now been found that the above-described objects are attained by using a loaded polymer latex composition in which an aqueous polymer latex represented by the general formula (I) is loaded with a hydrophobic substance represented by the general formula (II). The polymer represented by the general formula (I) is a crosslinked quaternary ammonium (or phosphonium) salt polymer which is used as a mordanting agent. The general formula (I) is

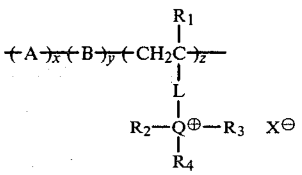

(I)

wherein A represents a constitutional repeating unit derived from a copolymerizable monomer having at least two ethylenic unsaturated groups; B represents a constitutional repeating unit derived from an ethylenic unsaturated monomer which can be copolymerized with monomers giving the unit A and a z-component (i.e.,

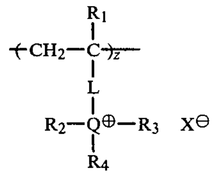

component in the general formula (I)), respectively; $R_1$ represents a hydrogen atom or a lower alkyl group containing 1 to about 6 carbon atoms; L represents a divalent group containing 1 to about 12 carbon atoms; $R_2$, $R_3$ and $R_4$, which may be the same or different, each represents an alkyl group containing 1 to about 20 carbon atoms, or an aralkyl group containing 7 to about 20 carbon atoms, or they may combine with one another and form a ring structure together with Q; Q represents a nitrogen atom or a phosphorus atom; $X^{\ominus}$ represents an anion; x represents about 0.2 to about 15 mol%; y represents 0 to about 90 mol%; and z represents about 5 to about 99 mol%.

The general formula (II) is

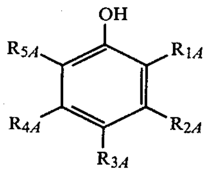

(II)

wherein $R_{1A}$, $R_{2A}$, $R_{3A}$, $R_{4A}$ and $R_{5A}$, which may be the same or different, each represents a hydrogen atom, an alkyl group, an aryl group, an alkenyl group, an aralkyl group, an alkoxy group, an aryloxy group, an alkenoxy group, an aralkoxy group, an alkylthio group, an arylthio group, a halogen atom, a hydroxy group, an amino group, an acylamino group, a diacylamino group, a sulfonamido group, an alkylamino group, a dialkylamino group, an arylamino group, a heterocyclic amino group, a sulfo group, an arylsulfonyl group, an arylsulfinyl group, an acyloxy group, an acyl group, an alkoxycarbonyl group,

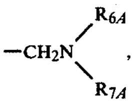
, $-(CH_2)_l R_{8A}$ or
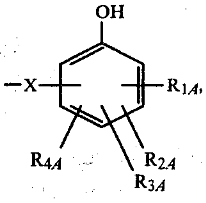

or they each may form a 5- or 6-membered carbon ring, a chroman ring or a coumaran ring in conjunction with their respective neighboring substituents (wherein $R_{6A}$ and $R_{7A}$ each represents a hydrogen atom, an alkyl group, an aryl group or an aralkyl group, or they may combine with each other to form a 5- or 6-membered ring; $R_{8A}$ represents an alkoxycarbonyl group; X represents a single bond, —S—, —S—S—, —O—, —CH$_2$—S—CH$_2$—, —CH$_2$—O—CH$_2$—, —SO$_2$—, —SO—,

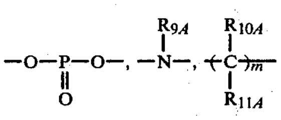
or
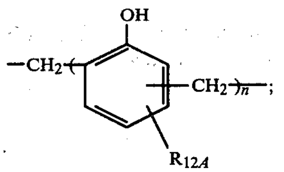

l, m and n each represents an integer of 1 to 3; $R_{9A}$ represents a hydrogen atom, an alkyl group or an aryl group; $R_{10A}$ and $R_{11A}$ each represents a hydrogen atom, an alkyl group or an aryl group, or they may combine with each other to form a 5- or 6-membered ring; and $R_{12A}$ represents a hydrogen atom, an alkyl group or an aryl group).

DETAILED DESCRIPTION OF THE INVENTION

Suitable examples of monomers having at least two or more (preferably two to four) ethylenic unsaturated groups which correspond to the unit A in the general formula (I) by which the polymer dispersion (latex) of the present invention is represented include esters, amides, olefins and aryl compounds.

Specific examples of copolymerizable monomers having at least two ethylenic unsaturated groups which can be preferably employed include ethylene glycol dimethacrylate, diethylene glycol dimethacrylate, neopentylglycol dimethacrylate, tetramethylene glycol dimethacrylate, pentaerythritol tetramethacrylate, trimethylol propane trimethacrylate, ethylene glycol diacrylate, diethylene glycol diacrylate, neopentyl glycol diacrylate, tetramethylene glycol diacrylate, trimethylol propane triacrylate, allylmethacrylate, allylacrylate, diallylphthalate, methylenebisacrylamide, methylenebismethacrylamide, trivinyl cyclohexane, divinylbenzene, N,N-bis(vinylbenzyl)-N,N-dimethylammonium chloride, N,N-diethyl-N-(methacryloyloxyethyl)-N-(vinylbenzyl)ammonium chloride, N,N,N',N'-tetraethyl-N,N'-bis(vinylbenzyl)-p-xylylenediammonium dichloride, N,N'-bis(vinylbenzyl)triethylenediammonium chloride, N,N,N',N'-tetrabutyl-N,N'-bis(vinylbenzyl)ethylenediammonium dichloride and the like. Among these monomers, divinylbenzene and trivinyl cyclohexane are particularly preferred from the viewpoint of hydrophobic character and alkali resistance. Also, the unit A may include two or more of the above-described monomers.

The unit B is derived from ethylenic unsaturated monomers copolymerizable with both the monomers of the unit A and the z-component. Examples of such ethylenic unsaturated monomers include olefins (e.g., ethylene, propylene, 1-butene, vinyl chloride, vinylidene chloride, isobutene, vinyl bromide, etc.), dienes (e.g., butadiene, isoprene, chloroprene, etc.), ethylenic unsaturated esters of fatty acids or aromatic carboxylic acids (e.g., vinyl acetate, allyl acetate, vinyl propionate, vinyl butyrate, vinyl benzoate, etc.), esters of ethylenic unsaturated acids (e.g., methylmethacrylate, butylmethacrylate, tertbutylmethacrylate, cyclohexylmethacrylate, benzylmethacrylate, phenylmethacrylate, octylmethacrylate, amylacrylate, 2-ethylhexylacrylate, benzylacrylate, maleic acid dibutyl ester, fumaric acid diethyl ester, ethyl crotonate, methylene malonic acid dibutyl ester, etc.), styrenes (e.g., styrene, α-methylstyrene, vinyltoluene, chloromethylstyrene, chlorostyrene, dichlorostyrene, bromostyrene, etc.), and unsaturated nitriles (e.g., acrylonitrile, methacrylonitrile, allyl cyanate, crotononitrile, etc.). Among these monomers, styrenes and methacrylic acid esters are especially preferred in view of their emulsion polymerizability and hydrophobic character. Also, the unit B may include two or more of the above-described monomers.

The substituent $R_1$ represents a hydrogen atom or a lower alkyl group having 1 to about 6 carbon atoms. Hydrogen atom and methyl group are particularly preferred with respect to polymerizing reactivity and so on.

The moiety L represents a divalent group having 1 to about 12 carbon atoms, more particularly

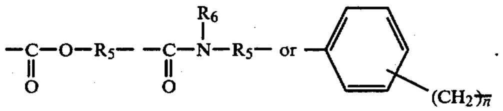

Among these divalent groups,

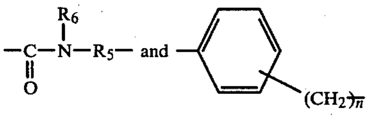

are more preferable from the viewpoints of alkali resistance and so on. The most suitable one with respect to emulsion polymerizability and mordanting ability is

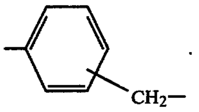

In the above-described structural formulae, $R_5$ represents an alkylene (e.g., methylene, ethylene, trimethylene, tetramethylene, etc.), an arylene or an aralkylene (e.g.,

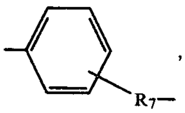

, wherein $R_7$ represents an alkylene having 1 to about 6 carbon atoms); and $R_6$ represents a hydrogen atom or the substituent $R_2$; and n represents an integer of 1 or 2.

Q represents a nitrogen atom or a phosphorus atom. A nitrogen atom is preferable with respect to the harmlessness of starting materials to be used and so on.

$X^-$ represents an anion, with specific examples including halogen ions (e.g., chlorine ion, bromine ion, iodine ion, etc.), alkylsulfuric acid ions (e.g., methylsulfuric acid ion, ethylsulfuric acid ion, etc.), alkyl- or aryl-sulfonic acid ions (e.g., methanesulfonic acid, ethanesulfonic acid, benzenesulfonic acid, p-toluenesulfonic acid, etc.), acetic acid ion and sulfuric acid ion. Among these ions, a chlorine ion, alkylsulfuric acid ions and arylsulfonic acid ions are especially preferable ones.

$R_2$, $R_3$ and $R_4$, which may be the same as or different, each represents an alkyl group having 1 to about 20 carbon atoms or an aralkyl group having 7 to about 20 carbon atoms. Each of the groups may have some substituents, or they may combine with one another to form a ring structure together with Q.

Specific examples of alkyl groups include unsubstituted alkyl groups (e.g., methyl, ethyl, propyl, isopropyl, t-butyl, hexyl, cyclohexyl, 2ethylhexyl, dodecyl and so on), and substituted alkyl groups such as alkoxyalkyl groups (e.g., methoxymethyl, methoxybutyl, ethoxyethyl, butoxyethyl, vinyloxyethyl and so on), cyanoalkyl groups (e.g., 2-cyanoethyl, 3-cyanopropyl and so on), halogenated alkyl groups (e.g., 2-fluoroethyl, 2-chloroethyl, perfluoropropyl and so on), alkoxycarbonylalkyl groups (e.g., ethoxycarbonylmethyl and so on), allyl group, 2butenyl group, propargyl group and so on.

Specific examples of the aralkyl group include unsubstituted aralkyl groups (e.g., benzyl, phenethyl, diphenylmethyl, naphthylmethyl, etc.) and substituted aralkyl groups such as alkylaralkyl groups (e.g., 4-methylbenzyl group, 2,5-dimethylbenzyl group, 4-isopropylbenzyl group, 4-octylbenzyl group, etc.), alkoxyaralkyl group (e.g., 4-methoxybenzyl group, 4-pentafluoropropenyloxybenzyl group, 4-ethoxybenzyl group, etc.), cyanoaralkyl groups (e.g., 4-cyanobenzyl group, 4-(4-cyanophenyl)benzyl group, etc.), halogenated aralkyl groups (e.g., 4-chlorobenzyl group, 3-chlorobenzyl group, 4-bromobenzyl group, 4-(4-chlorophenyl)benzyl group, etc.) and the like.

Preferred alkyl group for $R_2$, $R_3$ and $R_4$ has 1 to 12 carbon atoms, and preferred aralkyl group for $R_2$, $R_3$ and $R_4$ has 7 to 14 carbon atoms.

Specific examples of the ring structure which the substituents, $R_2$, $R_3$ and $R_4$ form together with Q by connecting to one another include

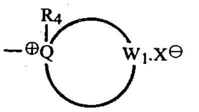

[wherein $W_1$ represents atoms necessary to form an aliphatic heterocyclic ring, the aliphatic heterocyclic ring being

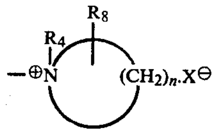

(wherein $R_8$ represents a hydrogen atom or $R_4$; and n represents an integer of 2 to 12),

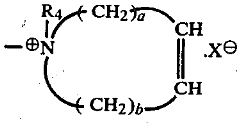

(wherein a+b=an integer of 2 to 7),

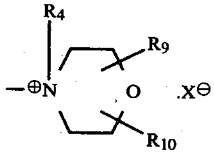

(wherein $R_9$ and $R_{10}$ each represents a hydrogen atom or a lower alkyl group having 1 to 6 carbon atoms),

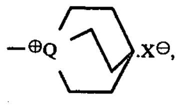

or so on],

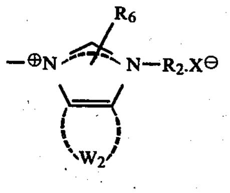

(wherein $W_2$ may be absent, or represents atoms necessary to form a benzene ring),

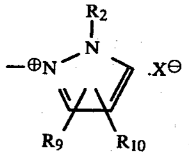

or

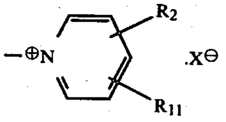

(wherein $R_{11}$ represents a hydrogen atom,

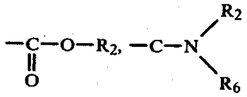

or $R_2$).

Among these ring structures,

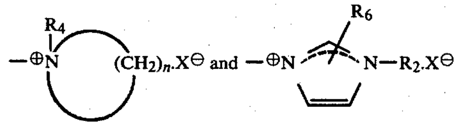

are preferable.

In the above-described examples, $R_2$, $R_4$, $R_6$, Q and $X^{\ominus}$ have the same meanings in the general formula (I), respectively.

The z-component may be a mixture of two or more of units thereof.

x represents about 0.2 to about 15 mol%, particularly 1.0 to 10 mol%; y represents 0 to about 90 mol%, particularly 20 to 60 mol%; and z represents about 5 to about 99 mol%, particularly 20 to 80 mol% and more particularly 30 to 70 mol%.

Aqueous polymer latex represented by the general formula (I) can be prepared by emulsion-polymerizing the above-described monomer having at least two ethylenic unsaturated groups (i.e., for the unit A), the ethylenic unsaturated monomer (i.e., for the unit B) and a monomer represented by the following general formula (III) and then by reacting the product with a compound of formula

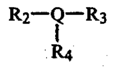

to convert the product into a quaternary salt;

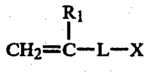

(III)

wherein L, X and $R_1$ have the same meanings as in the general formula (I), respectively.

Specific examples of the monomer represented by the general formula (III) include chloromethylstyrene, bromomethylstyrene, p-toluenesulfonylmethylstyrene, vinylbenzylchloroacetate, N-(p-chloromethylphenyl)acrylamide, methacrylamidoethyl-p-toluenesulfonate, methacryloyloxyethyl-p-toluenesulfonate, bromoethylmethacrylate, bromoethylmethacrylamide and the like.

Specific examples of the compound represented by the formula

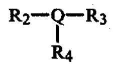

(wherein $R_2$, $R_3$, $R_4$ and Q have the same meanings as in the general formula (I), respectively) include N-methylaziridine, N-methylazetidine, N-methylpyrrolidine, N-ethylpyrrolidine, N-methylpyrroline, N-benzylpyrrolidine, N-methylpiperidine, N-ethylpiperidine, N-benzylpiperidine, N-p-chlorobenzylpiperidine, N-p-isopropylbenzylpiperidine, N-p-pentafluoropropenyloxybenzylpiperidine, N-methylhexamethyleneimine, N-benzylhexamethyleneimine, N-methyldodecamethyleneimine, N-benzyldodecamethyleneimine, trimethylamine, triethylamine, tributylamine, dimethylpropylamine, dimethylbenzylamine, tributylphosphine, trihexylamine, dimethyl-p-chlorobenzylamine, azabicyclooctane, N-methylimidazole, N-methyl-2-methylimidazole, N-methylpyrazole, pyridine, 3,5-lutidine, methylpyridine and so on.

When aqueous polymer latexes represented by the general formula (I) of the present invention are prepared according to the above-described process, the latexes obtained contain 0 to about 10 mol%, frequently 0 to about 5 mol%, of repeating units of the following formulae:

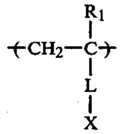

and

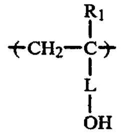

wherein L, X and $R_1$ have the same meanings as in the general formula (III).

Further, the aqueous polymer latexes represented by the general formula (I) can also be obtained by emulsion-polymerizing the above-described monomer having at least two ethylenic unsaturated groups (i.e., for the unit A), the ethylenic unsaturated monomer (i.e., for the unit B) and an unsaturated monomer represented by the general formula (IV) and then by reacting the products with an alkylating agent, an alkenylating agent or an aralkylating agent represented by the formula $R_4$-X to convert the products into quaternary salts:

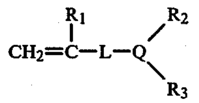

(IV)

wherein $R_1$, L, Q, $R_2$ and $R_3$ have the same meanings as in the general formula (I), respectively. Specific examples of the monomer represented by the general formula (IV) include N-vinylbenzylpyrrolidine, N-vinylbenzylpyrroline, N-vinylbenzylpiperidine, N-vinylbenzylhexamethyleneimine, N-vinylbenzyldodecamethyleneimine, N,N-dimethylaminopropylmethacrylate, N,N-diethylaminoethylmethacrylate, N,N-dimethylaminopropylmethacrylamide, N-(N',N'-dimethylaminomethylphenyl)acrylamide, N-(N',N'-dihexylaminomethyl)methacrylamide and so on. Among these monomers, especially preferable ones are N-vinylbenzylpiperidine, N-vinylbenzylhexamethyleneimine and N-(N',N'-dimethylaminomethylphenyl)acrylamide.

Specific examples of the alkylating agent, the alkenylating agent and the aralkylating agent which are represented by the formula $R_4$-X (where $R_4$ and X have the same meanings as in the general formula (I)) include p-toluene-methylsulfonate, dimethylsulfuric acid, diethylsulfuric acid, ethyl bromide, allyl chloride, n-butyl bromide, ethyl chloroacetate, n-hexyl bromide, benzyl chloride, p-chlorobenzyl chloride, p-methylbenzyl chloride, p-isopropylbenzyl chloride, p-pentafluoropropenyloxybenzyl chloride and so on. Among these compounds, preferable ones are benzyl chloride, p-chlorobenzyl chloride, p-toluene-methylsulfonate, dimethylsulfuric acid and diethylsulfuric acid.

Furthermore, the aqueous polymer latexes represented by the general formula (I) can also be prepared by emulsion-polymerizing the above-described monomer having at least two wthylenic unsaturated groups (i.e., for the unit A), the ethylenic unsaturated monomer (i.e, for the unit B), and an unsaturated monomer represented by the general formula (V):

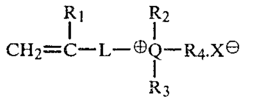

(V)

wherein $R_1$, $R_2$, $R_3$, $R_4$, L, Q and $X^{\ominus}$ have the same meanings as in the general formula (I).

Specific examples of the monomer represented by the general formula (V) include N-benzyl-N-vinylbenzylpiperidinium chloride, N-benzyl-N-vinylbenzylperhydroazepinium chloride, N-(4-chlorobenzyl)-N-vinylbenzylperhydroazepinium p-toluenesulfonate, N-methyl-N-vinylbenzyldodecamethyleneiminium chloride, N-benzyl-N'-vinylbenzylimidazolium chloride, 1-hexyl-2-methyl-3-vinylbenzylimidazolium chloride, 1-butyl-2-phenyl-3-vinylbenzylimidazolium chloride, 1-octyl-2-isopropyl-3-vinylbenzylimidazolium chloride, N-vinylbenzyl-p-phenylpyridinium chloride, N-vinylbenzyl-p-benzylpyridinium p-toluenesulfonate, N-vinylbenzyl-p-phenylpropylpyridinium chloride, N-benzyl-N'-vinylbenzylbenzimidazolium chloride, N-(N',N'-diethyl-N'-(p-isopropylbenzyl)ammoniomethylphenyl)acrylamide chloride, N-methacryloyloxyethyl-N,N-diethyl-N-p-chlorobenzylammonium chloride, N-methacrylamidopropyl-N,N-dimethyl-N-p-octylbenzylammonium chloride, N-vinylbenzyl-N,N,N-trihexylammonium chloride, N-vinylbenzyl-N,N,N-tributylammonium p-toluenesulfonate, N-vinylbenzyl-N,N-dibutyl-N-benzylammonium chloride, N-vinylbenzyl-N,N-diethyl-N-p-isopropylbenzylammonium chloride and the like.

Aqueous polymer latexes which can be employed in the present invention are advantageously prepared by reference to the processes described in Japanese Patent Publication No. 29195/72, Japanese Patent Application (OPI) Nos. 37488/73, 76593/73, 92022/73, 21134/74 and 120634/74, British Pat. Nos. 1,211,039 and 961,395, U.S. Pat. Nos. 2,795,564, 2,914,499, 3,033,833, 4,199,362, 3,547,899, 3,227,672, 3,290,417, 3,262,919, 3,245,932, 2,681,897 and 3,230,275 all of which are incorporated herein by reference to disclose such processes, Canadian Pat. No. 704,778, John C. Petropoulos et al., *Official Digest,* Vol. 33, pp. 719–736 (1961), Sadao Hayashi, *Emulsion Nyumon* (*Introduction to Emulsion*) (1970), Shoichi Muroi, *Kobunshi Latex no Kagaku* (*The Chemistry of Polymer Latex*) (1970), Takuhiko Motoyama, *Vinyl Emulsion* (1965), Mike, Shi-der, Juang, et al., *Journal of Polymer Science, Polymer Chemistry Edition,* Vol. 14, pp. 2089–2107 (1976) and so on. It is a matter of course that the abovedescribed processes can be widely and easily changed depending on the polymerization initiators, concentrations, polymerization temperatures, reaction times and the like depending upon the purposes of the present invention.

Specifically, the polymerization is generally carried out at a temperature of 20° C. to 180° C., preferably 40° C. to 120° C. The polymerization reaction is usually conducted using 0.05 to 5% by weight, to the weight of monomers to be polymerized, of a radical polymerization initiator and optionally 0.1 to 10% by weight of an emulsifier.

Suitable examples of the polymerization initiator include azobis compounds, peroxides, hydroperoxides, redox catalysts and so on, with specific examples including potassium persulfate, ammonium persulfate, tert-butyl peroctoate, benzoyl peroxide, isopropyl percarbonate, 2,4-dichlorobenzoyl peroxide, methylethylketone peroxide, cumene hydroperoxide, dicumyl peroxide, azobisisobutylonitrile, 2,2'-azobis(2-amidinopropane) hydrochloride and the like.

As examples of emulsifiers which can be used, mention may be made of anionic, cationic, amphoteric and nonionic surface active agents, and water-soluble polymers. Specific examples thereof include sodium laurate, sodium dodecylsulfate, sodium 1-octoxycarbonylmethyl-1-octoxycarbonylmethanesulfonate, sodium laurylnaphthalenesulfonate, sodium laurylbenzenesulfonate, sodium laurylphosphate, cetyltrimethylammonium chloride, dodecyltrimethylammonium chloride, N-2-ethylhexylpyridinium chloride, polyoxyethylenenonyl phenyl ether, polyoxyethylenesorbitan lauryl ester, polyvinyl alcohol, the emulsifiers and water-soluble polymers described in Japanese Patent Publication No. 6190/78 and so on.

The above-described reaction of converting the polymers into corresponding quaternary salts is generally carried out at a temperature of −10° C. to about 100° C., particularly 20° C. to 80° C. In order to prepare aqueous polymer latexes used in the present invention, one container may be used alone throughout for all steps. Furthermore, water-miscible organic solvents need not be used at the time of reaction for conversion into quaternary salts. Accordingly, preparation can be effected with ease and with high stability without being accompanied by coagulation and unstabilization of the latexes due to the addition of organic solvents.

Specific examples of aqueous polymer latexes used in the present invention are illustrated below.

I-1

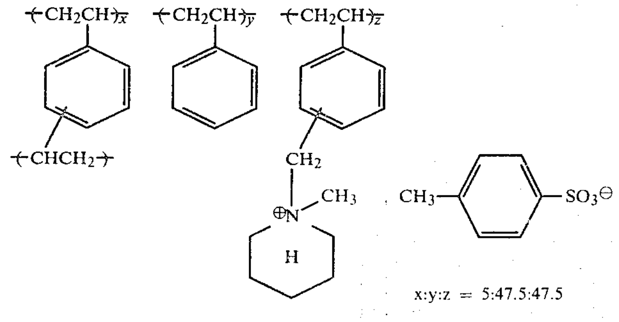

x:y:z = 5:47.5:47.5

-continued
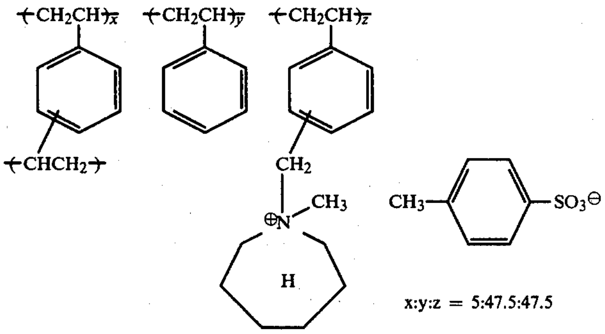
x:y:z = 5:47.5:47.5
I-2
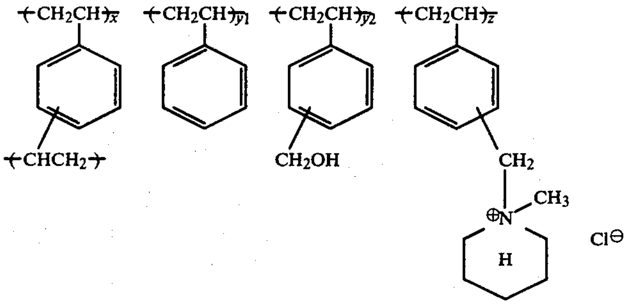
$x:y_1:y_2:z$ = 5:47.5:5.5:42
I-3
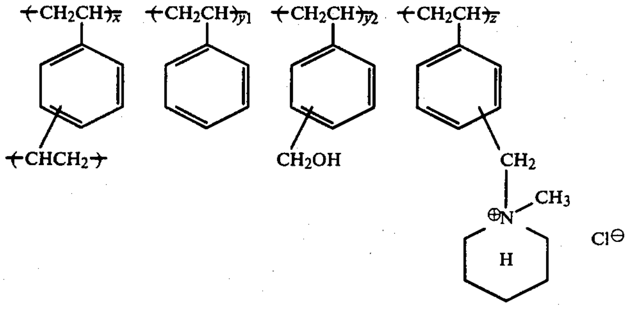
$x:y_1:y_2:z$ = 5:35:8:52
I-4
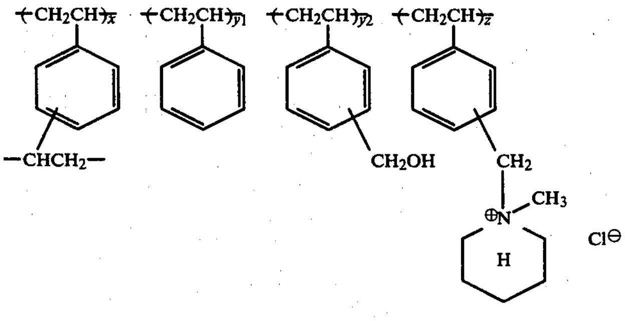
$x:y_1:y_2:z$ = 5:25:10:60
I-5

-continued
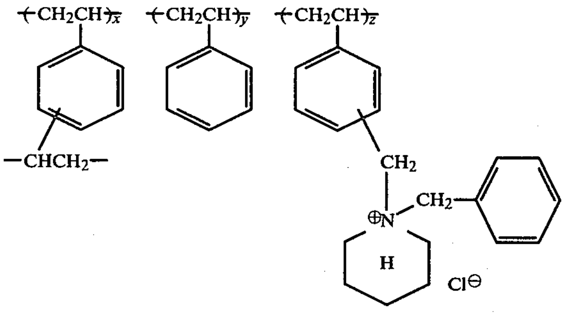
I-6
x:y:z = 5:47.5:47.5
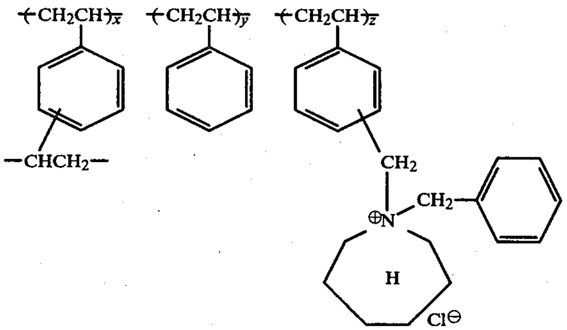
I-7
x:y:z = 5:47.5:47.5
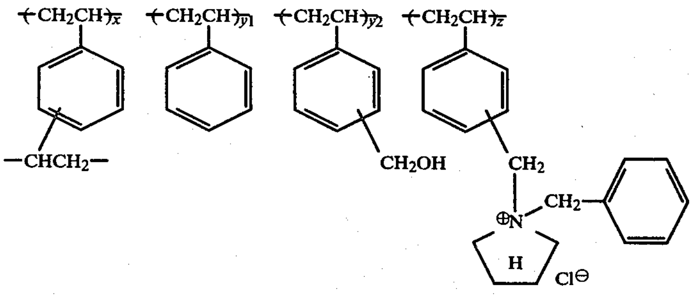
I-8
$x:y_1:y_2:z$ = 5:35:8:52
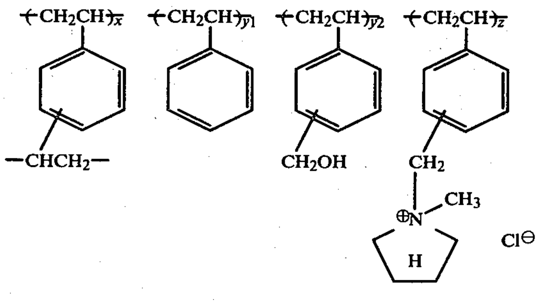
I-9
$x:y_1:y_2:z$ = 2:38:10:50

-continued
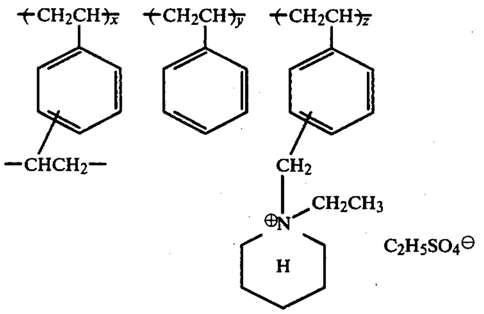
I-10
x:y:z = 1:49:50
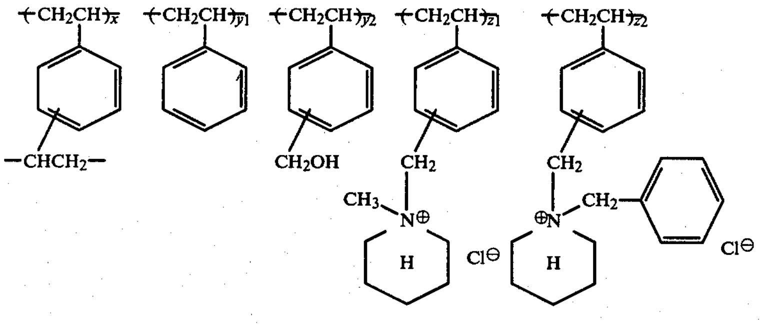
I-11
$x:y_1:y_2:z_1:z_2 = 5:47:5:30:13$
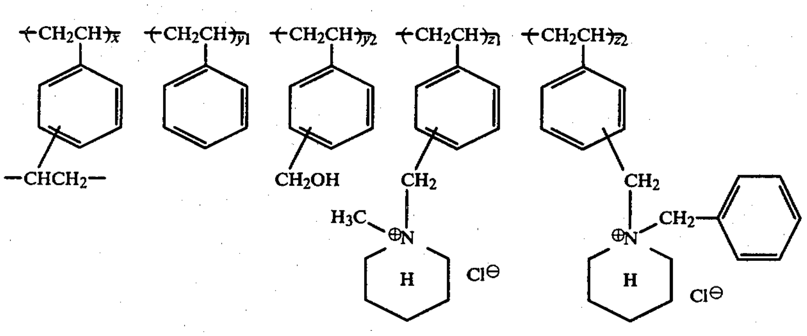
I-12
$x:y_1:y_2:z_1:z_2 = 5:47:5:13:30$
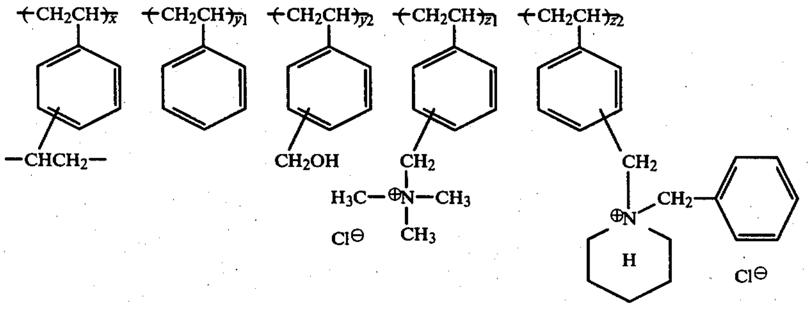
I-13
$x:y_1:y_2:z_1:z_2 = 5:47:5:13:30$ -continued
I-14
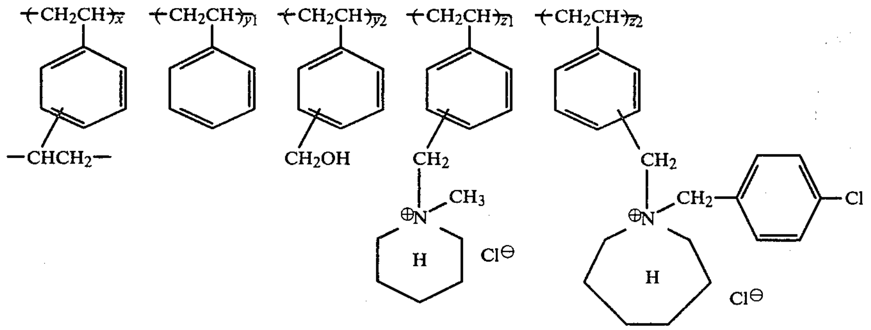
x:y1:y2:z1:z2 = 2:20:8:35:35
I-15
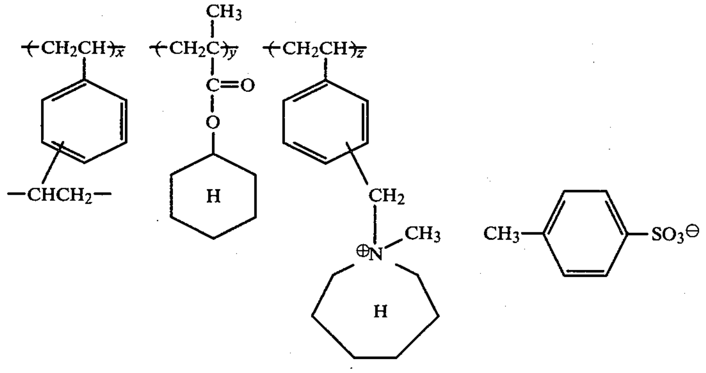
x:y:z = 2:63:35
I-16
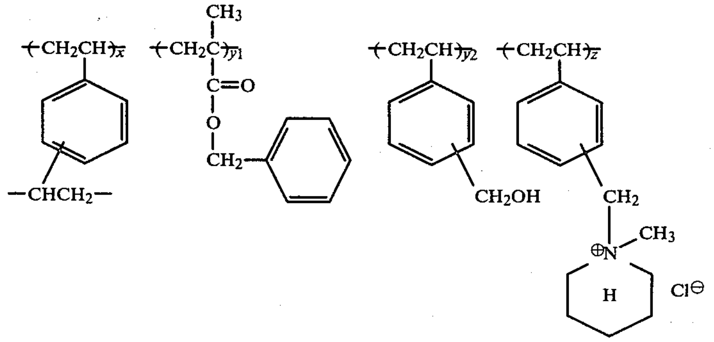
x:y1:y2:z = 4:52:6:38
I-17
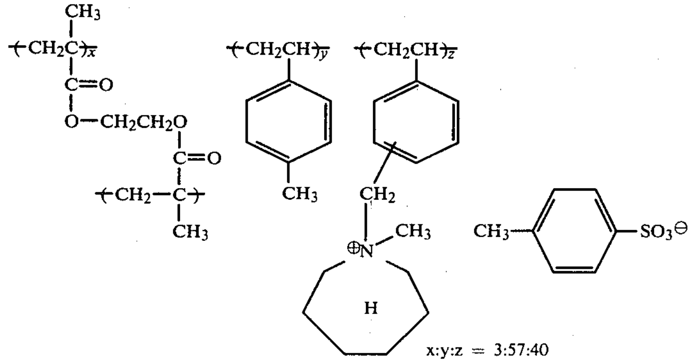
x:y:z = 3:57:40

-continued
I-18
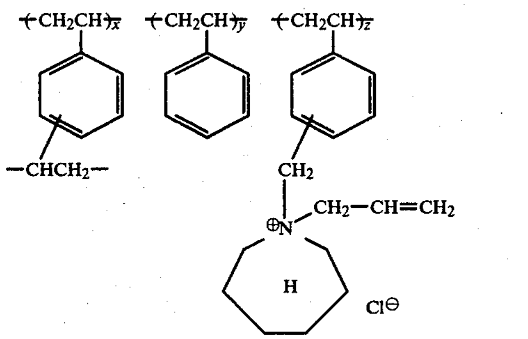
x:y:z = 4:60:36
I-19
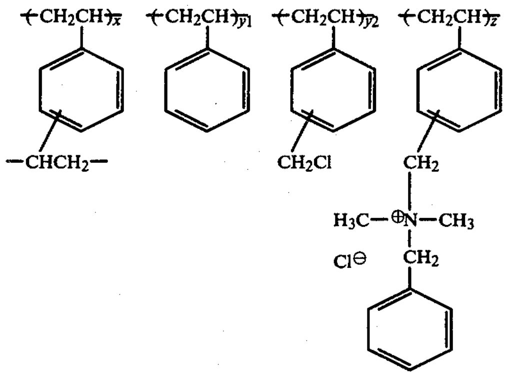
$x:y_1:y_2:z$ = 2:49:4.9:44:1
I-20
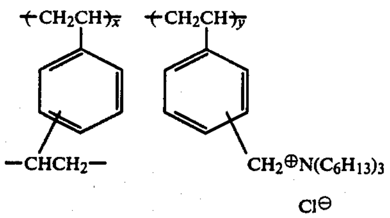
x:y = 5:95
I-21
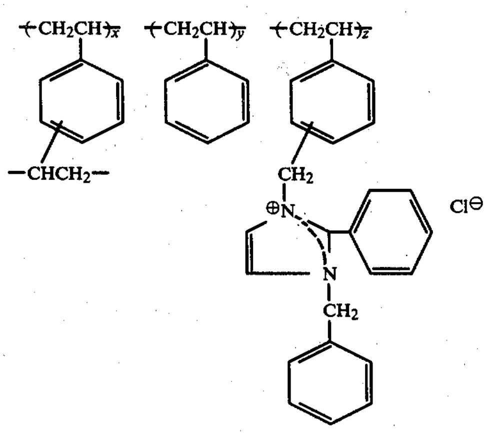
x:y:z = 3:56:41

-continued
I-22
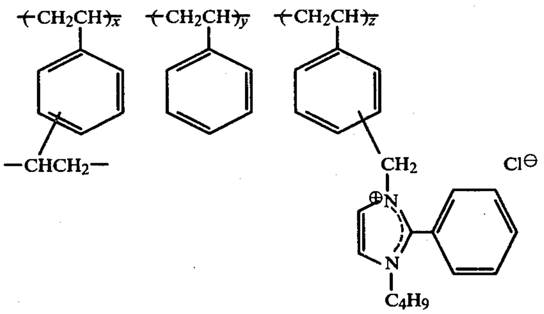
x:y:z = 4:48:48
I-23
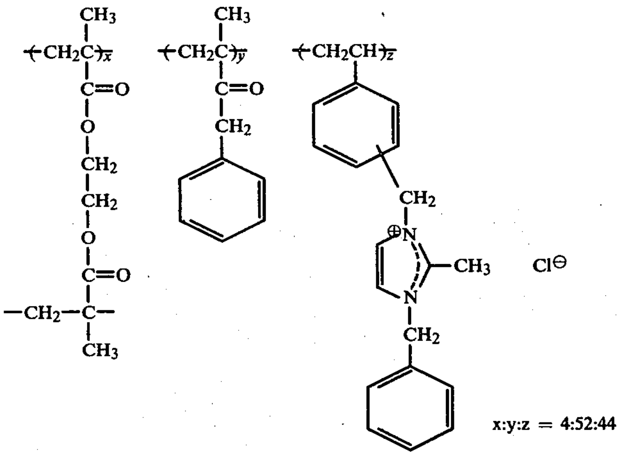
x:y:z = 4:52:44
I-24
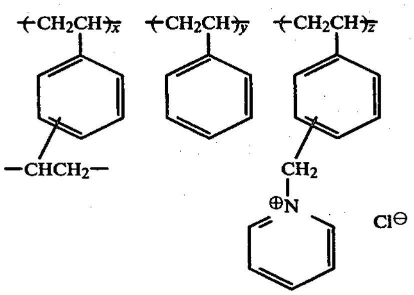
x:y:z = 2:38:60
I-25
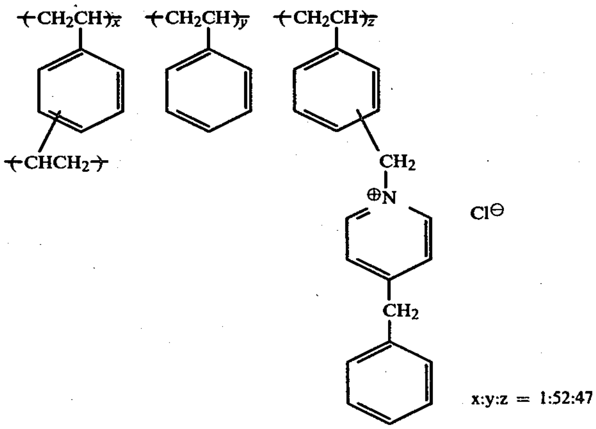
x:y:z = 1:52:47

-continued
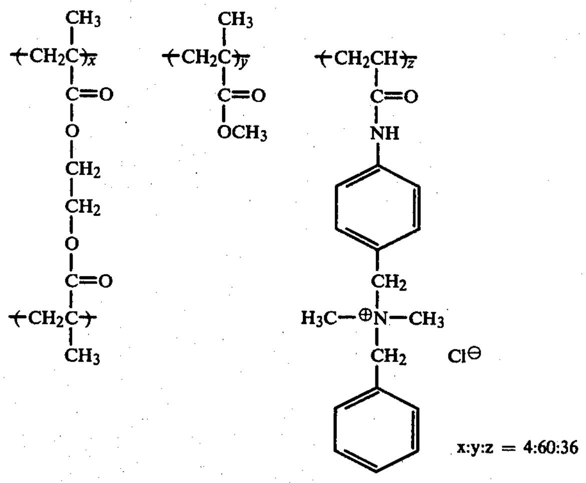
I-26
x:y:z = 4:60:36
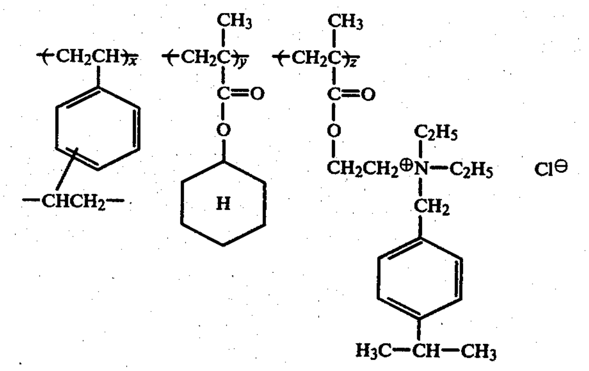
I-27
x:y:z = 4:48:48
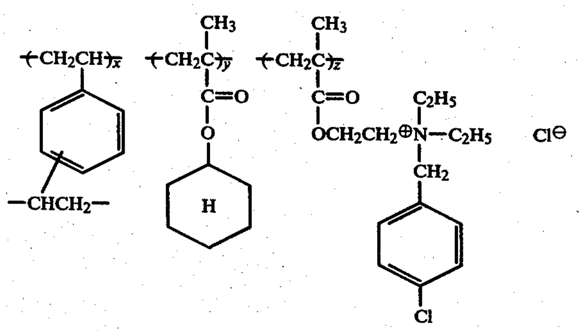
I-28
x:y:z = 4:48:48

-continued

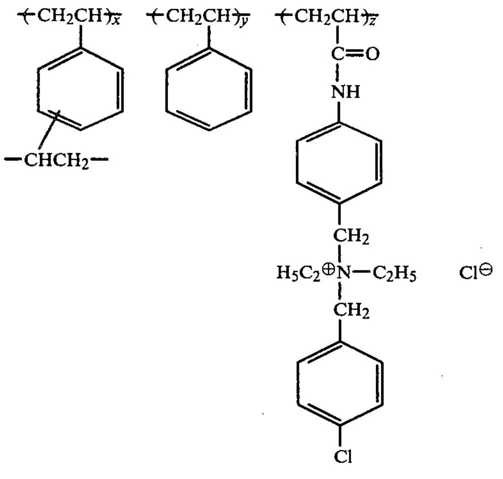

I-29 x:y:z = 2:49:49

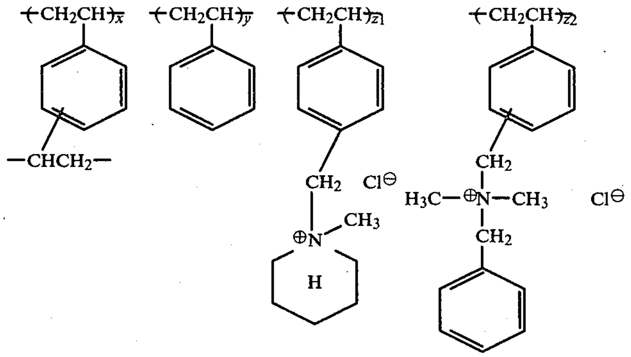

I-30

$x:y:z_1:z_2$ = 2:46:34:18

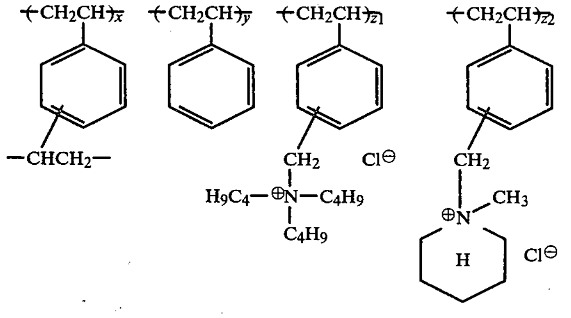

I-31

$x:y:z_1:z_2$ = 2:42:20:36

SYNTHESIS EXAMPLE 1

Synthesis of Polymer I-11

Into a 5 liter four neck flask equipped with a stirring device, a thermometer, a nitrogen gas introducing tube, a reflux condenser and a dropping funnel were injected 150 g of a 30% aqueous solution of the sodium salt of octylphenoxypolyethylene glycol sulfuric acid ester and 3.6 liter of distilled water. The temperature inside the flask was raised to 60° C. as air in the flask was replaced by nitrogen gas. The solution was stirred as it was maintained at that temperature. 76 g of divinylbenzene washed with an alkali solution having a concentration of 50%, 250.8 g of styrene purified by distillation, and 423.2 g of chloromethylstyrene washed with an alkali were mixed and placed in the dropping funnel (which mixture was named the solution A). A 1/10 portion of the solution A was injected into the flask and therein emulsification was allowed to run. Separately, 4.857 g of potassium persulfate and 1.214 g of sodium hydrogensulfite were dissolved in 100 ml of distilled water, and injected into the flask. After thirty minutes, a ½ portion of the solution prepared by dissolving 12.61 g of potassium persulfate and 3.152 g of sodium hydrogensulfite in 400 ml of distilled water (which solution was named the solution B) was injected into the flask. Immediately after the injection of the solution B, the solution A was added dropwise thereto as the addition rate was controlled so that the addition might be completed in one hour. At the conclusion of the addition the residual portion of the solution B was injected, and the stirring was further continued at 60° C. for 2 hours. Then, the reaction mixture was cooled to a room temperature. Thereto, a one normal sodium hydroxide aqueous solution was added as the pH of the resulting solution was checked using a pH meter till the pH thereof came to 7. The thus-obtained latex was named (L-1).

A 209 ml portion of the latex (L-1) was placed in a 0.5 liter three neck flask equipped with a stirring device and a thermometer and thereto 200 ml of distilled water was further added. Then, 7.34 g of N-methylpiperidine was added thereto and stirred at a room temperature for 20 minutes. Thereafter, the mixture was heated up to 60° C. and at this temperature it was further stirred for 2 hours. After cooling down to a room temperature, 5.56 g of N-benzylpiperidine was added to the reaction mixture and stirred for 30 minutes. Then, the mixture was heated again up to 70° C., and at this temperature it was stirred for 2 hours. The reaction was terminated by cooling the resulting reaction mixture down to a room temperature.

SYNTHESIS EXAMPLE 2

Synthesis of Polymer I-12

Polymer I-12 was prepared in the same manner as in Synthesis Example I except that N-methylpiperidine and N-benzylpiperidine were added in amounts of 1.93 ml and 6.93 ml, respectively, to 104 ml of the latex (L-1).

SYNTHESIS EXAMPLE 3

Synthesis of Polymer I-3

Into a 2 liter four neck flask equipped with the same accessories as used in Synthesis Example 1 were injected 20 g of a 30% aqueous solution of the sodium salt of octylphenoxypolyethylene glycol sulfuric acid ester and 780 ml of distilled water. As air in the flask was replaced by introducing nitrogen gas into the flask, the temperature of the flask was raised to 60° C. and maintained at this temperature. Thereto, 0.5 g of styrene was added and emulsified therein. To the resulting emulsion was added a solution prepared by dissolving 0.04 g of potassium persulfate, 0.015 g of sodium hydrogensulfite and 0.44 ml of 1 N sodium hydrogencarbonate in 5 ml of distilled water. After the passage of 1 hour and 20 minutes, a 2/5 portion of a solution prepared by dissolving 2.59 g of potassium persulfate and 0.998 g of sodium hydrogensulfite in 100 ml of distilled water (which solution was named the solution C) and 11.5 ml of 1 N sodium hydrogencarbonate were further added. Immediately after the addition, dropwise addition of a mixture of 56.6% of divinylbenzene washed with an alkali, 35 g of styrene and 56.01 g of chloromethylstyrene washed with an alkali from the dropping funnel was started, and completed in one hour. Thereinto, two-thirds of the residual portion of the solution C and 20 ml of 1 N sodium hydrogencarbonate were injected. After two hours passed, the remaining portion of the solution C and 5.75 ml of 1 N sodium hydrogencarbonate were further injected, and stirring was continued at 60° C. for additional 1 hour. Then the reaction mixture was cooled. The thus-obtained latex was named the latex (L-2).

32.76 g of N-methylpiperidine was added dropwise to the latex (L-2) at a room temperature for 20 minutes. Thereafter, the reaction mixture was stirred for 30 minutes and subsequently, it was heated up to 70° C. and stirred for an additional one hour. The reaction was terminated by cooling the reaction mixture to room temperature.

SYNTHESIS EXAMPLE 4

Synthesis of Polymer I-2

In a 1 liter four neck flask equipped with a stirring device, a thermometer, a dropping funnel, a nitrogen gas introducing tube and a reflux condenser were placed 3 g of nonylphenoxypolyethylene glycol, 0.5 g of polyvinyl alcohol (degree of polymerization: 500) and 400 ml of distilled water. 0.5 g of styrene was injected into the flask and therein emulsification was allowed to run. The emulsion made was heated to 70° C. as air in the flask was replaced by the introduction of nitrogen gas thereinto. Further, 0.04 g of 2,2'-azobis-2-amidinopropane hydrochloride was added thereto.

After one hour had passed, the temperature of the reaction mixture was adjusted to 60° C. and thereinto a ½ portion of the solution prepared by dissolving 0.82 g of 2,2'-azobis-2-amidinopropane hydrochloride in 100 ml of distilled water (which solution was named the solution D) was injected and without delay dropwise addition of a mixed solution consisting of 3.61 g of divinylbenzene having a concentration of 56.6% (which had received a washing treatment with an alkali), 14.41 g of styrene and 30.8 g of N-vinylbenzylhexamethyleneimine (which had been purified by distillation and had $bp_{1.9}$ of 126.5°-127.5° C.) from the dropping funnel was started. After one hour had passed from the beginning of the dropwise addition, one-half of the residual portion of the solution D was injected. At the conclusion of the dropwise addition, the other one-half of the residual portion of the solution D was injected. Therein, the dropwise addition was controlled so as to be completed in one and a half hours. The stirring was continued at 60° C. for an additional two hours and then the reaction system was cooled to room temperature. Thereto, 210 ml of distilled water was added and subsequently, 26.4 g of p-toluenemethylsulfonate was further added dropwise for 15 minutes. After 30 minutes, heating was started, and the reaction system was maintained at 70° C. for 2 hours. The reaction was terminated by cooling the reaction system. The thusobtained reaction product was put in a cellulose tube and dialyzed one day and night against running water in order to purify.

Hydrophobic substances with which the polymer latexes are loaded in the present invention are represented by the following general formula (II):

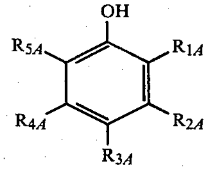
(II)

wherein $R_{1A}$, $R_{2A}$, $R_{3A}$, $R_{4A}$ and $R_{5A}$, which may be the same as or different, each represents a hydrogen atom, an alkyl group (preferably an alkyl group having 1 to about 20 carbon atoms, e.g., methyl, tert-butyl, cyclohexyl, terthexyl, tert-octyl or the like), an aryl group (preferably an aryl group having 6 to about 20 carbon atoms, e.g., phenyl or the like), an alkenyl group (preferably an alkenyl group having 2 to about 20 carbon atoms, e.g., allyl or the like), an aralkyl group (preferably an aralkyl group having 7 to about 20 carbon atoms, e.g.,benzyl, phenethyl or the like), an alkoxy group (preferably an alkoxy group having 1 to about 20 carbon atoms, e.g., methoxy, butoxy or the like), an aryloxy group (preferably an aryloxy group having 6 to about 20 carbon atoms, e.g., phenoxy or the like), an alkenoxy group (preferably an alkenoxy group having 2 to about 20 carbon atoms, e.g., allyloxy or the like), an aralkoxy group (preferably an aralkoxy group having about 7 to about 20 carbon atoms, e.g., benzyloxy or the like), an alkylthio group (preferably an alkylthio group having 1 to about 20 carbon atoms, e.g., methylthio, octylthio or the like), an arylthio group (preferably an arylthio group having 6 to about 20 carbon atoms, e.g., phenylthio or the like), a halogen atom (e.g., chlorine atom, bromine atom or the like), hydroxy group, amino group, an acylamino group (e.g., acetylamino, benzoylamino or the like), a diacylamino group (e.g., succinic acid imido, hydantoinyl or the like), a sulfonamido group (e.g., methanesulfonamido or the like), an alkylamino group (preferably an alkylamino group having 1 to about 20 carbon atoms, e.g., methylamino, butylamino or the like), a dialkylamino group (preferably a dialkylamino group having 2 to about 40 carbon atoms, e.g., N,N-dimethylamino or the like), an arylamino group (preferably an arylamino group having 6 to about 20 carbon atoms, e.g., anilino or the like), a 5- or 6-membered heterocyclic amino group of which heterocyclic ring moiety contains at least one hetero atom consisting of a nitrogen atom, an oxygen atom and a sulfur atom (e.g., 4,6-bisoctylthio-1,3,5-triazine-2-ylamino or the like), sulfo group, an arylsulfonyl group (preferably an arylsulfonyl group having 6 to about 20 carbon atoms, e.g., phenylsulfonyl or the like), an arylsulfinyl group (preferably an arylsulfinyl group having 6 to about 20 carbon atoms, e.g., phenylsulfinyl or the like), an acyloxy group (e.g., acetyloxy or the like), an acyl group (e.g., acetyl, benzoyl or the like), an alkoxycarbonyl group (preferably an alkoxycarbonyl group having 1 to about 20 carbon atoms, e.g., methoxycarbonyl, ethoxycarbonyl or the like),

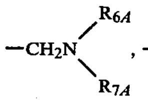

, $-(CH_2)_l-R_{8A}$ or

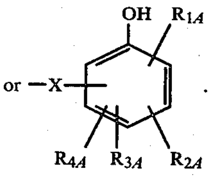

In addition, these substituents $R_{1A}$, $R_{2A}$, $R_{3A}$, $R_{4A}$ and $R_{5A}$, respectively, may form a 5- or 6-membered carbon ring, a chroman ring or a coumaran ring in conjunction with their respective neighboring substituent. In the above-described substituents, $R_{6A}$ and $R_{7A}$ each represents a hydrogen atom, an alkyl group (preferably an alkyl group having 1 to about 20 carbon atoms, e.g., methyl, tert-butyl, hexyl or the like), an aryl group (preferably an aryl group having 6 to about 20 carbon atoms, e.g., phenyl or the like) or an aralkyl group (preferably an aralkyl group having 7 to about 20 carbon atoms, e.g., benzyl or the like), or they may combine with each other and form a 5- or 6-membered ring. $R_{8A}$ represents an alkoxycarbonyl group (preferably an alkoxycarbonyl group having 2 to about 20 carbon atoms, e.g., methoxycarbonyl, butoxycarbonyl, octadecyloxycarbonyl or the like). X represents a single bond, —S—, —S—S—, —O—, $—CH_2—S—CH_2—$, $—CH_2—O—CH_2—$, $—SO_2—$, —SO—,

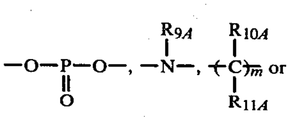

or

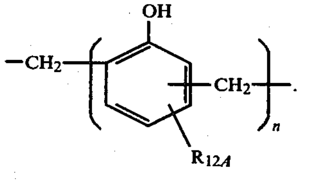

Therein, l, m and n each represents an integer of 1 to 3. $R_{9A}$ represents a hydrogen atom, an alkyl group (preferably an alkyl group having 1 to about 10 carbon atoms, e.g., methyl, ethyl, butyl, hexyl or the like) or an aryl group (preferably an aryl group having 6 to about 15 carbon atoms, e.g., phenyl or the like). $R_{10A}$ and $R_{11A}$ each represents a hydrogen atom, an alkyl group (preferably an alkyl group having 1 to about 10 carbon atoms, e.g., methyl, ethyl, isopropyl, butyl or the like) or an aryl group (preferably an aryl group having 6 to about 15 carbon atoms, e.g., phenyl, 4-hydroxyphenyl or the like), or they may combine with each other and form a 5- or 6-membered ring. $R_{12A}$ represents a hydrogen atom, an alkyl group (preferably an alkyl group having 1 to about 20 carbon atoms, e.g., methyl, tert-butyl, tert-octyl or the like) or an aryl group (preferably an aryl group having 6 to about 20 carbon atoms, e.g., phenyl or the like).

Further, alkyl groups and aryl groups represented by the substituents $R_{1A}$ to $R_{12A}$ may be substituted with halogen atoms, hydroxy groups, sulfo groups, carboxyl groups, alkoxycarbonyl groups (preferably those having 2 to about 19 carbon atoms), acyloxy groups, alkoxy groups (preferably those having 1 to about 19 carbon atoms), aryloxy groups (preferably those having 6 to about 19 carbon atoms), alkylthio groups (preferably those having 1 to about 19 carbon atoms), amido groups (e.g., acetamido, octadecanamido, ethanesulfonamido, benzamido, etc.), amino groups, alkylamino groups (preferably those having 1 to about 19 carbon atoms) or dialkylamino groups (preferably those having 2 to about 38 carbon atoms); and as for the aryl groups, they may be further substituted with alkyl groups (preferably those having 1 to about 14 carbon atoms), nitro groups or so on.

Among the compounds represented by the general formula (II), those having the following general formulae (VI), (VII), (VIII) and (IX) are especially effective:

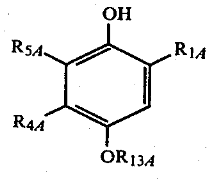

(VI)

-continued

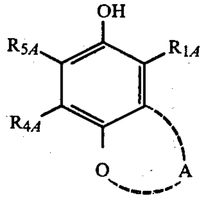

(VII)

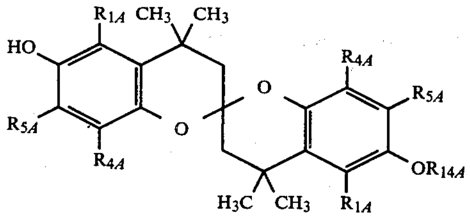

(VIII)

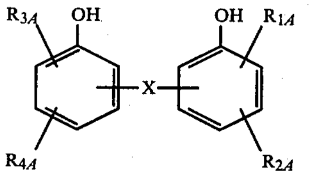

(IX)

$R_{1A}$, $R_{2A}$, $R_{3A}$, $R_{4A}$, $R_{5A}$ and X in the general formulae (VI), (VII), (VIII) and (IX) have the same meanings as in the general formula (II), respectively. $R_{13A}$ represents a hydrogen atom, an alkyl group (e.g., methyl, ethyl, isopropyl, tert-butyl, octyl, etc.), an aryl group (e.g., phenyl, etc.), an aralkyl group (e.g., benzyl, phenethyl, etc.) or a terpenyl group (e.g., 7,7-dimethylnorbornyl, etc.). $R_{14A}$ represents a hydrogen atom, an alkyl group (e.g., methyl, tert-butyl, cyclohexyl, isoamyl, octyl, etc.), an aryl group (e.g., phenyl, etc.), an aralkyl group (e.g., benzyl, etc.), an alkenyl group (e.g., allyl, etc.), an acyl group (e.g., acetyl, pivaloyl, benzoyl, etc.), or a sulfonyl group (e.g., methanesulfonyl, benzenesulfonyl, etc.).

A represents non-metal atoms necessary to form a 5- or 6-membered ring (the non-metal atoms including, e.g., carbon atom, oxygen atom, nitrogen atom, sulfur atom and hydrogen atom). This ring may be substituted with an alkyl group (e.g., methyl, tert-butyl, cyclohexyl, octyl, etc.), an alkoxy group (e.g., methoxy, butoxy, octyloxy, etc.), an aryl group (e.g., phenyl, etc.), an ayloxy group (e.g., phenoxy, etc.), an aralkyl group (e.g., benzyl, phenethyl, etc.), an aralkoxy group (e.g., benzyloxy, etc.), an alkenyl group (e.g., allyl, etc.), an alkenyloxy group (e.g., allyloxy, etc.), an N-substituted amino group (e.g., alkylamino, dialkylamino, N-alkyl-N-arylamino, piperadino, morpholino, etc.), a heterocyclic group (e.g., benzothiazolyl, benzoxazolyl, imidazolyl, oxazolyl, etc.) and so on. In addition, the ring may be substituted with such residue as to form a condensed ring. The alkyl groups and the aryl groups represented by $R_{13A}$, $R_{14A}$ and A may be further substituted with certain groups. Such groups include, e.g., the same groups as described with respect to $R_{1A}$ to $R_{13A}$ in the general formula (II).

More preferable compounds are those which have $R_{13A}$ being a hydrogen atom or an alkyl group containing 1 to 20 carbon atoms in the above-described general formula (VI), those which have A being atoms necessary to form a chroman ring or a coumaran ring in the above-described general formula (VII), those which have either $R_{1A}$ or $R_{4A}$ being a hydrogen in the above-described formula (VIII), and those which have X being —S—, —O—,

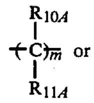 or 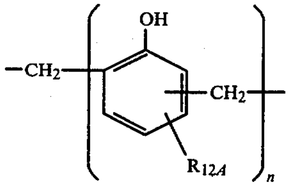

in the above-described general formula (IX).

Specific examples of the hydrophobic substance of the present invention are illustrated below:

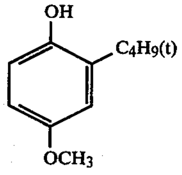

II-1

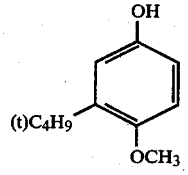

II-2

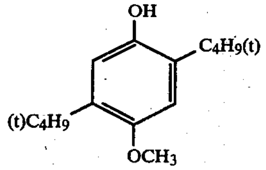

II-3

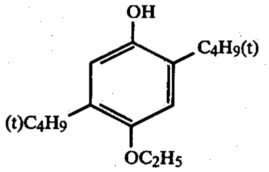

II-4

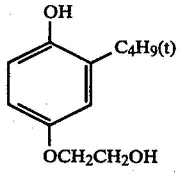

II-5

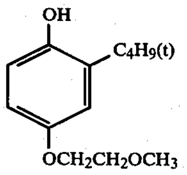

II-6

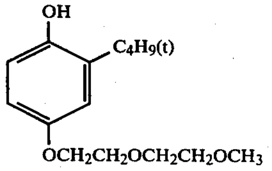

II-7

-continued
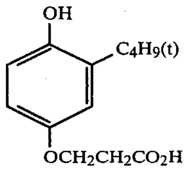
II-8
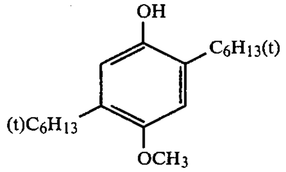
II-9
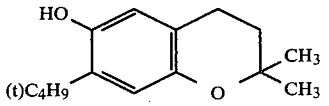
II-10
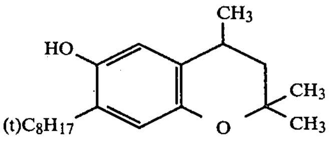
II-11
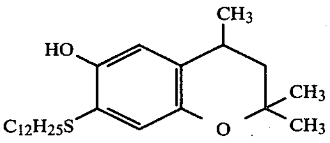
II-12
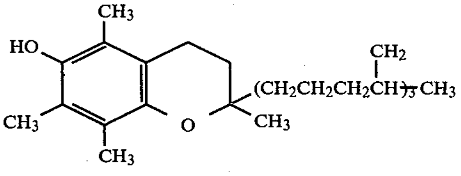
II-13
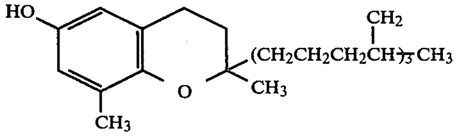
II-14
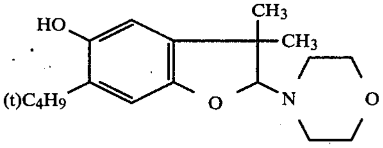
II-15
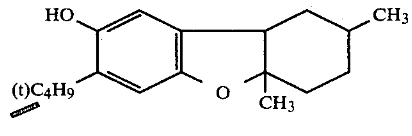
II-16
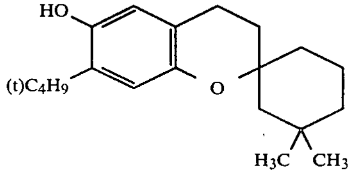
II-17
-continued
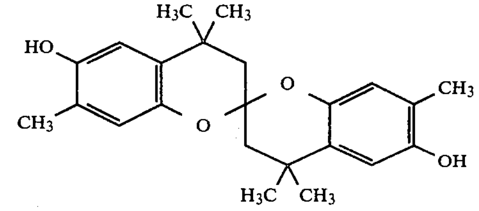
II-18
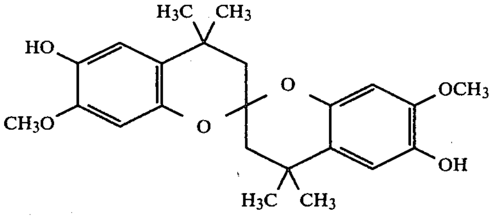
II-19
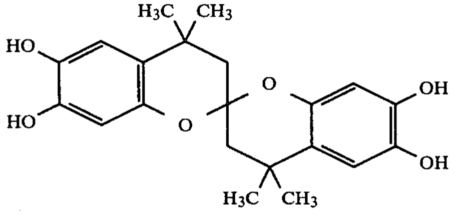
II-20
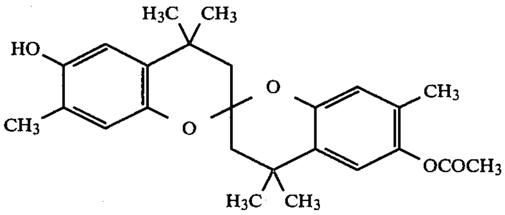
II-21
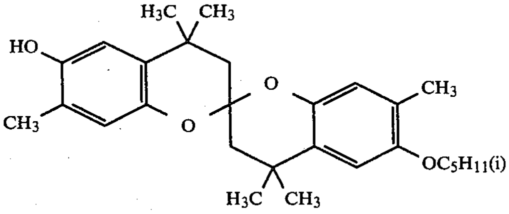
II-22
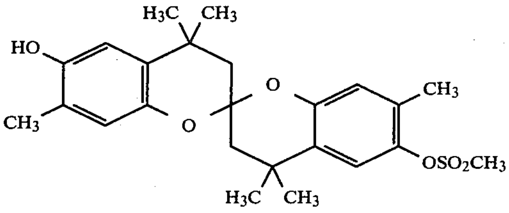
II-23
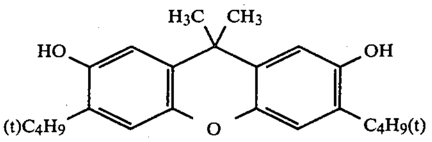
II-24
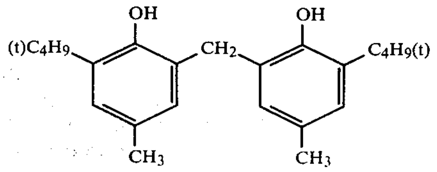
II-25

-continued
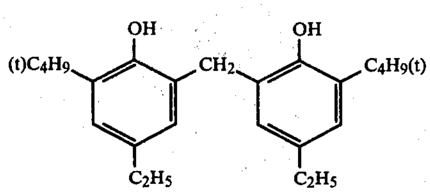
II-26
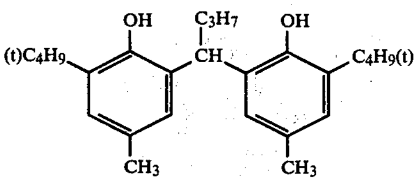
II-27
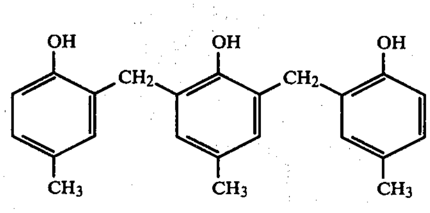
II-28
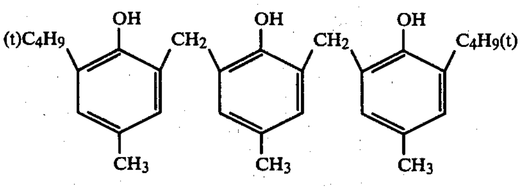
II-29
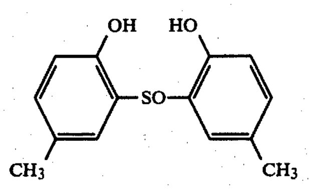
II-30
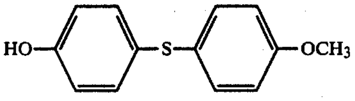
II-31
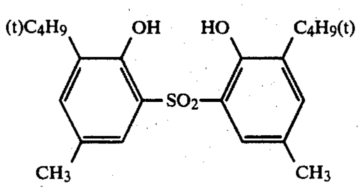
II-32
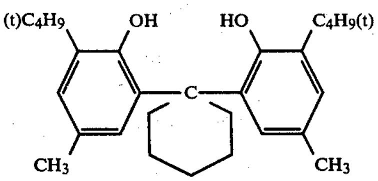
II-33
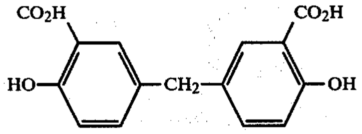
II-34
-continued
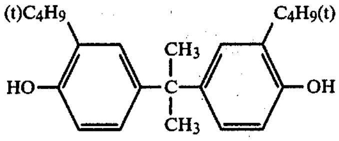
II-35
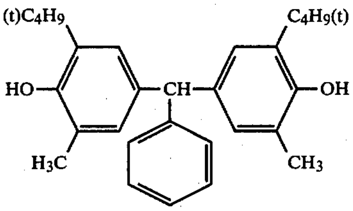
II-36
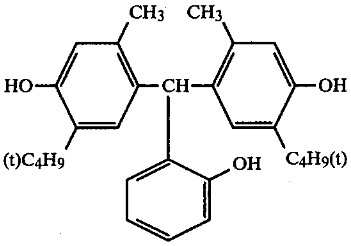
II-37
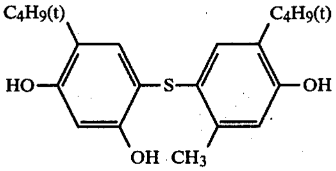
II-38
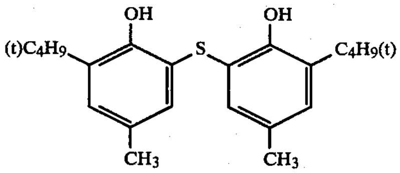
II-39
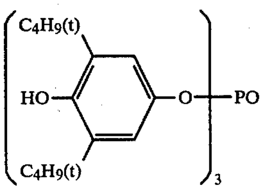
II-40
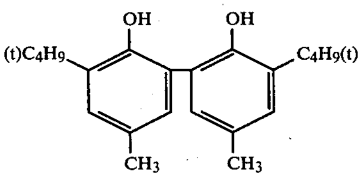
II-41
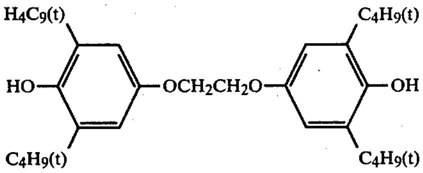
II-42

-continued
II-43
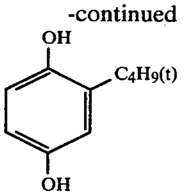
II-44
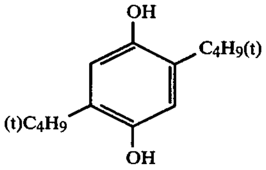
II-45
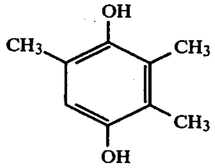
II-46
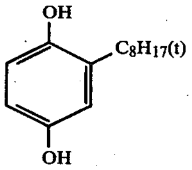
II-47
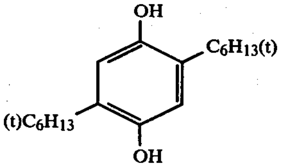
II-48
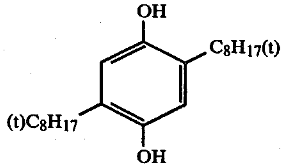
II-49
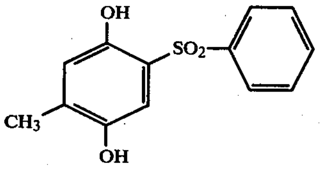
II-50
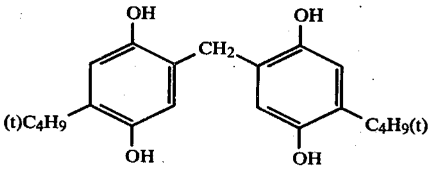
II-51
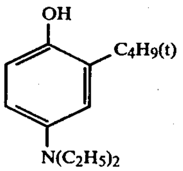
-continued
II-52
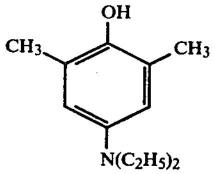
II-53
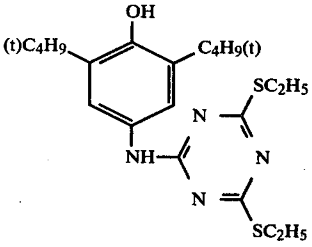
II-54
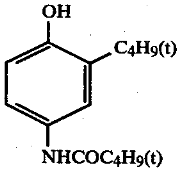
II-55
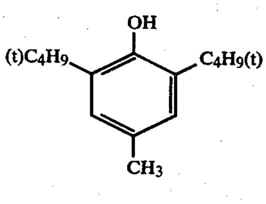
II-56
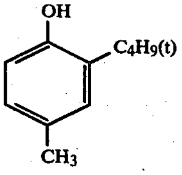
II-57
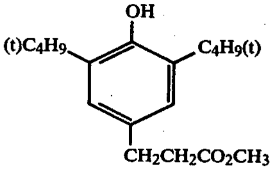
II-58
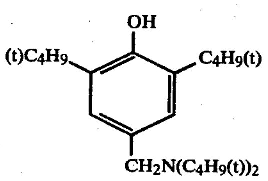
II-59
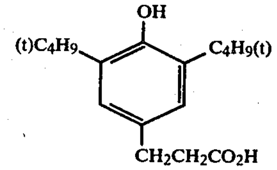

-continued

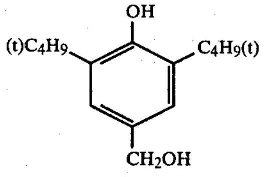

II-60

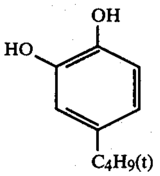

II-61

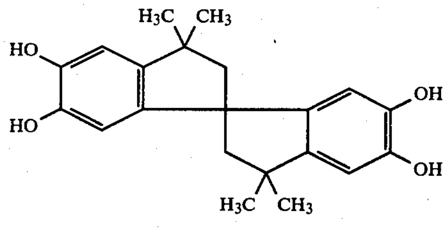

II-62

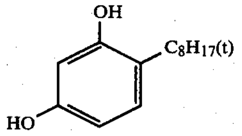

II-63

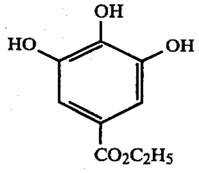

II-64

Hydrophobic substances which can be employed in the present invention are the compounds described in U.S. Pat. Nos. 2,336,327, 2,535,058, 2,792,428, 2,796,445, 2,841,619, 3,184,457, 3,285,937 and 3,432,300, all of which are incorporated herein by reference to disclose such compounds, German Patent Application (OLS) Nos. 2,005,301, 2,008,376, 2,140,309, 2,146,668 and 2,165,371, and *Journal of the Chemical Society,* p. 243 (1954), or can be synthesized according to the methods described in the above-described patents and journal.

In the loaded polymer latex composition of the present invention, the hydrophobic substance is believed to be held by adsorption on the surface of the cross-linked quaternary ammonium (or phosphonium) polymer latex, or to be absorbed by the cross-linked quaternary ammonium (or phosphonium) polymer latex. The present invention is characterized by the loading of the cross-linked latex with the hydrophobic substance, and examples of the process for loading which can be employed in the present invention include the method of adding a hydrophobic substance dissolved in a water miscible organic solvent to an aqueous latex; the method of mixing a first flow of an aqueous latex with a second flow of a solution of a hydrophobic substance dissolved in a water miscible organic solvent, as described in Japanese Patent Application (OPI) No. 59942/76; the method of adding an aqueous latex to a water miscible organic solvent in which a hydrophobic substance is dissolved, as described in Japanese Patent Application (OPI) No. 59943/76; and the methods described in Japanese Patent Application (OPI) Nos. 32552/79, 107941/79 and 110247/79. However, the methods which can be employed are not intended to be construed as being limited to these examples.

When an aqueous latex is loaded with a hydrophobic substance in accordance with an embodiment of the present invention, the latex is not restricted in concentration. However, latexes having a solid content of 30% by weight or less, particularly 15% by weight or less, are preferably employed.

A ratio of the amount of an aqueous polymer latex to the amount of a hydrophobic substance with which the latex is to be loaded (a loading proportion) should be properly selected depending upon the process for loading, the kind and amount of a water miscible organic solvent to be used, the hydrophobicity of a loading hydrophobic substance to be used, the structure of a latex to be used, the kind and the amount of a surface active agent used, and so on. However, the latex is, in general, loaded with a 3 to 50% by weight, preferably 5 to 25% by weight, based on the solid content of the latex, of hydrophobic substance.

Typical examples of water miscible organic solvents which are useful in the present invention include ethyl alcohol, methyl alcohol, isopropyl alcohol, acetone, methyl ethyl ketone, tetrahydrofuran, N-methylpyrrolidone, dimethyl formaldehyde, dimethyl sulfoxide and mixtures thereof. However, the solvent which can be used is not limited to these examples. In addition, at the conclusion of the loading process, such solvents may be removed from the latex composition by evaporation or dialysis.

The mixing ratio of a water miscible organic solvent to water changes depending upon the kind and the amount of hydrophobic substance to be used for loading, the kind of water miscible organic solvent, the mixing means used and so on. Therefore, it cannot be absolutely said that some particular range of the ratios are more advantageous. However, such a high ratio of a water miscible organic solvent as to dissolve all portion of a hydrophobic substance present in the loading system must be avoided, because it is supposed that a certain process for loading the polymer latex particles with the hydrophobic substance includes the following steps: The hydrophobic substance dissolved in the water miscible organic substance is separated out by mixing with the aqueous polymer latex and at the same time, deposited and adsorbed on individual surfaces of latex particles and further, as the case may be, absorbed by the latex particles.

The loaded polymer latex composition obtained in accordance with an embodiment of the present invention may be used in such a form that paper, cloth or the like is impregnated with the composition alone, or the composition is mixed with another hydrophilic polymer, such as gelatin, polyvinyl alcohol, polyvinyl pyrrolidone or the like, as occasion demands, and coated on a support such as paper, cloth, film base, metal, wood or the like.

The compositions of the present invention are advantageously employed as mordanting agents for acid dyes, particularly as mordanting agents for image-receiving layers of photographic elements for dye transfer or color diffusion process. However, they may be used in other many purposes.

Application of the present invention to photographic elements for color diffusion transfer process will now be illustrated below.

As examples of preferred embodiments of typical photographic elements employed for obtaining photographic prints using a color diffusion transfer processes, mention may be made of:

(1) A so-called "integral unit type" of light-sensitive material in which a light-sensitive sheet comprising a transparent support having thereon, in sequence, an image receiving layer, a white light-reflecting layer, a light-shielding layer containing carbon black, a cyan dye image-providing compound-containing layer, a red-sensitive silver halide emulsion layer, an interlayer, a magenta dye image-providing compound-containing layer, a green-sensitive silver halide emulsion layer, an interlayer, a yellow dye image-providing compound-containing layer, a blue-sensitive silver halide emulsion layer and a protecting layer is superposed upon a cover sheet comprising a second transparent support having thereon, in sequence, a neutralizing layer and a timing layer in face-to-face contact with each other, and a pressure rupturable container retaining a processing solution containing carbon black is arranged at such a position that the processing solution may be spread in a layer form between the above-described two sheets, and these three elements are united and fixed in a body.

Constitutions of such a film unit as described above have so far been well-known except for the use of the composition of the present invention in its image-receiving layer. For instance, there are detailed descriptions in *Photographic Science and Engineering,* Vol. 20, No. 4, pp. 155-164 (July/August, 1976). Therein, reaction mechanisms of the transferred image formation in such a film unit as described above are also illustrated in detail.

(2) A so-called "integral unit type" of light-sensitive material in which an image receiving sheet comprising a transparent support having thereon, in sequence, a neutralizing layer, a timing layer and an image receiving layer is superposed on a light-sensitive sheet in face-to-face contact with each other, the light-sensitive sheet comprising a second, opaque support having thereon, in sequence, a cyan dye image-providing compound-containing layer, a red-sensitive silver halide emulsion layer, an interlayer, a magenta dye image-providing compound-containing layer, a green-sensitive silver halide emulsion layer, an interlayer, a yellow dye image-providing compound-containing layer, a blue-sensitive silver halide emulsion layer and a protecting layer, and a pressure rupturable container retaining a processing solution which contains plural pH indicator dyes and white pigment for a white light-reflecting layer is arranged in such a position that the processing solution may be spread in a layer form between the image receiving sheet and the light-sensitive sheet, and these three elements are united and fixed in a body.

Constitutions of such a film unit as described above have so far been well-known except for the use of the composition of the present invention in its image receiving layer. For instance, there are detailed descriptions in *Neblette's Handbook of Photography and Reprography Materials, Processes and Systems,* Seventh Ed., Chap. 12 (1977). Therein, reaction mechanisms of the transferred image formation in such a film unit are also illustrated in detail. Further, pH indicator dyes which can be used in such a film unit are described in U.S. Pat. Nos. 3,647,437 and 3,833,615, and so on.

The layer constructions in the embodiments (1) and (2) can be changed as the occasion may demand. For example, each of dye image-providing compounds and silver halide may be contained in the same layer. In addition, a timing layer may have a multilayer structure. Further, the film unit may be so designed that the image receiving sheet can be peeled apart from the light-sensitive sheet.

Photographic prints to which the present invention is to be applied are preferably those which are produced using integral unit type of light-sensitive materials as described above, that is, integral unit type of photographic prints.

Silver halide emulsions which can be used in photographic elements for the color diffusion transfer process are hydrophilic colloidal dispersions of silver chloride, silver bromide, silver chlorobromide, silver iodobromide, silver chloroiodobromide or a mixture thereof. Their halogen compositions should be selected depending upon the end-use purposes and processing conditions of the light-sensitive materials. However, pure silver bromide, silver iodobromide having an iodide content of 10 mol% or less, and silver chloroiodide having a chloride content of 30 mol% of less are especially advantageous.

Suitable examples of silver halide emulsions of the kind which form latent image inside the grains and substantially no latent image on the surface of the grains, which are used to advantage in the present invention, include conversion type of emulsions, core/-shell type of emulsions, emulsions in which different kinds of metals are incorporated and so on, as described in U.S. Pat. Nos. 2,592,250, 3,206,313, 3,447,927, 3,761,276 and 3,935,014 and so on.

Typical examples of nucleating agents suitable for the emulsions of the above-described kind include hydrazines described in U.S. Pat. Nos. 2,588,982 and 2,563,785; hydrazides and hydrazones described in U.S. Pat. No. 3,227,552; quaternary salt compounds described in British Pat. No. 1,283,835, Japanese Patent Publication No. 38164/74, and U.S. Pat. Nos. 3,734,738, 3,179,494 and 3,615,615; sensitizing dyes having nucleating substituents in individual dye molecules described in U.S. Pat. No. 3,178,470; and acylhydrazinophenylthiourea series compounds described in U.S. Pat. Nos. 4,030,925 and 4,031,127.

Silver halide emulsions may optionally contain spectral sensitizing dyes and thereby they can acquire extended color sensitivity. Suitable examples of spectral sensitizing dyes are cyanine dyes, merocyanine dyes and the like.

As dye image-providing compounds, various kinds of compounds can be employed. However, couplers and dye releasing redox compounds are especially useful.

As examples of the dye releasing redox compound of the type which releases dye by hydrolysis with an alkali only when it has received oxidation, mention may be made of those described in U.S. Pat. Nos. 4,053,312, 4,055,428, 4,076,529, 4,152,153, 4,135,929, 4,268,625, 4,273,855 and 4,149,892, Japanese Patent Application (OPI) Nos. 104343/76, 46730/78, 3819/78, 16130/81 and 16131/81, and so on.

As for the yellow dye releasing ones, they are described in U.S. Pat. Nos. 4,013,633 and 4,268,625, Japanese Patent Application (OPI) Nos. 114930/76 and 71072/81, *Research Disclosure,* 17630 (1978) and 16475 (1977), and so on.

As for the magenta dye releasing ones, they are described in U.S. Pat. Nos. 3,954,476, 3,931,144, 3,932,308, 4,268,624, 4,233,237, 4,255,509 and 4,250,246, Japanese Patent Application (OPI) Nos. 23628/78, 106727/77, 36804/80, 149777/79, 146655/79 and 42848/79, German Patent Application (OLS) No. 2,847,371, and so on.

As for the cyan dye releasing ones, they are described in U.S. Pat. Nos. 3,942,987, 3,929,760, 4,013,635, and 4,268,625, Japanese Patent Application (OPI) Nos. 8827/77, 143323/78, 47823/78 and 71061/81, and so on.

As examples of the dye releasing redox compound of the type which release dye by undergoing ring closure or the like only when it has not yet received oxidation, mention may be made of those described in U.S. Pat. Nos. 4,139,379 and 3,980,479, German Patent Application (OLS) Nos. 2,402,900 and 2,448,811, and so on.

Dye releasing redox compounds represented by the following general formula are advantageously employed in preferred embodiments of the present invention:

Y—X wherein Y represents a mother nucleus of the redox compound (carried), and X represents a dye residue or a dye precursor residue attached to Y directly or through a connecting or linkage group L.

The connecting or linkage group L includes an alkylene group (or alkylidene group) having 1 to 6 carbon atoms, an arylene group, or a heterocyclic ring residue, and it is bound to X directly or through —O—, —S—, $-SO_2-$, $-NR_0-$ (where $R_0$ represents a hydrogen atom or an alkyl group), —CO—, —CO—NH— or $-SO_2-NH-$.

The above-described dye residues may include, in principle, residues of any kind of dye, provided that they have diffusibilities high enough to arrive at the image receiving layer passing through photographic layers present in a light-sensitive material. In order to impart sufficient diffusibilities to dye residues, one or more of a water solubility-providing groups can be bound to a dye residue, if necessary. Suitable examples of the water solubility-providing group include a carboxy group, a sulfo group, a sulfonamide group, a sulfamoyl group and aliphatic or aromatic hydroxyl groups.

Examples of dyes which can be especially preferably employed in the present invention include azo dyes, azomethine dyes, anthraquinone dyes, phthalocyanine dyes, indigoid dyes, triphenylmethane dyes, metal complex dyes and colored metal complexes.

The term dye precursor residue used above means the residues of compounds which can be converted to dyes by their respective auxochromes being liberated in the chromophore systems through oxidation (that is, the auxochromes being liberated and participating in chromophore) at the stage of a common processing or an additional processing in the process of photographic processings. In this case, the dye precursors may be leuco dyes or dyes capable of being converted into other dyes during photographic processings.

Effective Y in the redox compounds as described above is an N-substituted sulfamoyl group. As examples of such Y, mention may be made of those having the following general formula (A):

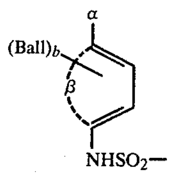

(A)

In the formula (A), β represents non-metal atoms necessary to form a benzene ring, and the benzene ring may form a condensed ring together with a carbon ring or hetero ring, such as naphthalene ring, quinoline ring, 5,6,7,8-tetrahydronaphthalene ring, chroman ring or the like. In addition, the benzene ring or the condensed ring formed by a benzene ring and a carbon ring or a hetero ring may be substituted with halogen atoms, alkyl groups, alkoxy groups, aryl groups, aryloxy groups, nitro groups, amino groups, alkylamino groups, arylamino groups, amido groups, cyano groups, alkylmercapto groups, keto groups, carboalkoxy groups, heterocyclic groups and the like.

α represents a group of formula $-OG^1$ or $-NHG^2$. Therein, $G^1$ represents a hydrogen atom or a group capable of producing a hydroxy group through hydrolysis, preferably a hydrogen atom, $$-\underset{\underset{O}{\|}}{C}G^3 \text{ or } -\underset{\underset{O}{\|}}{C}-O-G^3,$$

wherein $G^3$ represents an alkyl group, particularly an alkyl group having 1 to 18 carbon atoms such as methyl, ethyl, propyl, etc.; a halogen substituted alkyl group having 1 to 18 carbon atoms such as chloromethyl, trifluoromethyl, etc.; phenyl group; or a substituted phenyl group. $G^2$ represents a hydrogen atom, an alkyl group having 1 to 22 carbon atoms or a group capable of being hydrolyzed. Preferred examples of the group capable of being hydrolyzed which is represented by $G^2$ include $$-\underset{\underset{O}{\|}}{C}-G^4,$$

$-SO_2G^5$ and $-SOG^5$. Therein, $G^4$ represents an alkyl group having 1 to 4 carbon atoms, such as methyl; a halogen substituted alkyl group, such as mono-, di- or trichloromethyl, or trifluoromethyl; an alkylcarbonyl group such as acetyl; an alkyloxy group; a substituted phenyl group such as nitrophenyl or cyanophenyl; a phenyloxy group which may be substituted with a lower alkyl group or a halogen atom, or not; a carboxyl group; an alkyloxycarbonyl group; an aryloxycarbonyl; an alkylsulfonylethoxy group; or an arylsulfonylethoxy group. $G^5$ represents a substituted or an unsubstituted alkyl or aryl group.

b represents zero or an integer of 1 to 2. Therein, b may be zero when such an alkyl group as to render the compound represented by the general formula (A) immobile and non-diffusible is introduced into $G^2$ of $-NHG^2$ represented by the above-described α. On the other hand, when α represents $-OG^1$ or $-NHG^2$ and the $G^2$ represents a hydrogen atom, an alkyl group having 1 to 8 carbon atoms or a group capable of being hydrolyzed, b must be 1 or 2, preferably 1. Ball represents a group capable of imparting diffusion resistance to the compound of the general formula (A).

Specific examples of such a kind of Y are described in Japanese Patent Application (OPI) Nos. 33826/73 and 50736/78, U.S. Pat. Nos. 4,135,929 and 4,258,120.

As another example of Y suitable for the compound of this type, mention may be made of a group represented by the general formula (B):

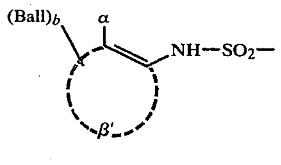

(B)

In the general formula (B), Ball, α and b have the same meanings as in the general formula (A), respectively, and β′ represents atoms necessary to form a carbon ring, e.g., a benzene ring, and the benzene ring may form a condensed ring together with a carbon ring or a hetero ring, such as a naphthalene ring, a quinoline ring, a 5,6,7,8-tetrahydronaphthalene ring, a chroman ring or the like. In addition, the above-described various rings each may be substituted with a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a heterocyclic group or so on. Specific examples of such a kind of Y are described in Japanese Patent Application No. 16131/81, U.S. Pat. Nos. 4,053,312, 4,055,428, 4,268,625, 4,268,624, 4,233,237 and 4,245,028, and so on.

Couplers which can be employed in the present invention are those described in, e.g., T. H. James, *The Theory of Photographic Process,* 4th Ed., Chap. 12 (1977). The following descriptions are made using representative redox compounds. However, they can be applied with other dye image-providing compounds.

A coating amount of a dye-releasing redox compound is $1\times10^{-4}$ to $1\times10^{-2}$ mol/m$^2$, preferably $2\times10^{-4}$ to $2\times10^{-3}$ mol/m$^2$.

The dye-releasing redox compounds which can be employed in the present invention can be dispersed into hydrophilic colloids, which function as a carrier, using various processes depending on their types. For instance, the dispersion of the compound containing a dissociable group such as sulfo or carboxy group can be effected by dissolving the compound in water or an alkaline aqueous solution and then adding it to a hydrophilic colloidal solution. On the other hand, the compounds which are hardly dissolved in aqueous media and readily dissolved in organic solvents can be dispersed in the following manners:

(1) The compound is dissolved in a high boiling point solvent which is substantially water-insoluble and then the resulting solution is added to a hydrophilic colloidal solution and dispersed thereinto. This process is described in U.S. Pat. Nos. 2,322,027, 2,533,514 and 2,801,171. Therein, a low boiling point solvent or an organic solvent which can be readily dissolved in water may optionally be used in addition to the above-described high boiling point ones, and such a solvent is removed from the dispersion by evaporation upon drying, washing with water or the like means.

(2) The compound is dissolved in a water-miscible solvent and then dispersed into a hydrophilic colloidal solution.

(3) The compound is dispersed into a hydrophilic colloidal solution in the same manner as in the above-described process (1) except that an oleophilic polymer is employed instead of the high boiling point solvent or in combination with the high boiling point solvent. This process is described in, e.g., U.S. Pat. No. 3,619,195 and German Patent (DAS) No. 1,957,467.

(4) The compound is dissolved in a water-miscible solvent and thereto an aqueous latex is added little by little resulting in the formation of a dispersion in which the compound is incorporated in latex particles. The process is described in, e.g., Japanese Patent Application (OPI) No. 59943/76.

In addition to the above-described processes, a hydrosol of an oleophilic polymer as described in, e.g., Japanese Patent Publication 39835/76 may be added in a hydrophilic colloid dispersion obtained using one of the above-described processes.

Dispersion of the dye releasing redox compound is markedly facilitated using a surface active agent as an emulsifying aid. Surface active agents useful therefor are described in, e.g., the above-described patent specifications, Japanese Patent Publication No. 4923/64 and U.S. Pat. No. 3,676,141.

Suitable examples of hydrophilic colloids which can be used for dispersing dye-releasing redox compounds to be employed in the present invention include gelatin; colloidal albumin; casein; cellulose derivatives such as carboxymethyl cellulose, hydroxyethyl cellulose, etc.; sugar derivatives such as agar, sodium alginate, starch derivatives, etc.; synthetic hydrophilic colloids such as polyvinyl alcohol, poly-N-vinylpyrrolidone, acrylic acid copolymers, polyacrylamide and derivatives thereof (e.g., partially hydrolyzed products thereof); and so on. A mixture of two or more of these colloids, which are compatible with one another, may be optionally used. Among these colloids, gelatin is the most commonly used one. However, a part or all of the gelatin may be replaced by a synthetic hydrophilic colloid upon use.

Processes for obtaining color diffusion transfer images using dye releasing redox compounds are described in *Photographic Science and Engineering,* Vol. 20, No. 4, pp. 155–164 (July/August 1976).

In the above-described processes, any silver halide developers can be employed, provided that they can undergo cross-oxidation. Such developers may be retained in alkaline processing compositions, or incorporated in proper layers of photographic elements. Developers which can be used in the present invention include hydroquinones described in Japanese Patent Application (OPI) No. 16131/81, aminophenols, phenylenediamines, pyrazolidinones (e.g., phenidone, 1-phenyl-3-pyrazolidinone, 1-phenyl-4,4-dimethyl-3-pyrazolidinone, 1-p-tolyl-4-methyl-4-oxymethyl-3-pyrazolidinone, 1-(4′-methoxyphenyl)-4-methyl-4-oxymethyl-3-pyrazolidinone, 1-phenyl-4-methyl-4-oxymethyl-3-pyrazolidinone, etc.) and so on.

Among the above-described developers, white-and-black developers (especially pyrazolidinones) are more preferable rather than color developers like phenylenediamines, since the former generally possess the ability to reduce stain formation in an image-receiving layer.

The processing composition contains a base such as sodium hydroxide, potassium hydroxide, sodium carbonate, sodium phosphate or the like, and has an alkalinity of pH=9 or higher, preferably 11.5 or higher. The processing composition can additionally contain an antioxidant such as sodium sulfite, ascorbates, piperidinohexose reductone or so on; and a silver ion concentration controlling agent such as potassium bromide or so on. Further, a viscosity increasing compound such as hydroxyethyl cellulose, sodium carboxymethyl cellulose, or so on may be incorporated therein.

Furthermore, such a compound as to accelerate development or diffusion of dyes (e.g., benzyl alcohol or the like) may be contained in an alkaline processing composition.

In the light-sensitive elements to which the present invention can be applied, dye image providing compounds are used in combination with silver halide emulsions. The combination of color sensitivity of a silver halide emulsion and spectral absorption of dye image is properly selected depending on the intended color reproduction. Upon the reproduction of natural color by a subtractive color process, a light-sensitive element is employed comprising at least two combinations wherein each consists of an emulsion having a selective spectral sensitivity in some wavelength region and a compound capable of providing a dye image having a selective spectral absorption in the same wavelength region. An especially useful light-sensitive elements are comprised of the combination of a blue-sensitive silver halide emulsion and a yellow dye-releasing redox compound, the combination of a green-sensitive silver halide emulsion and a magenta dye-releasing redox compound, and the combination of a red-sensitive silver halide emulsion and a cyan dye-releasing redox compound. The combination unit of such an emulsion and a dye-releasing redox compound as described above may be present in such a form that the emulsion and the redox compounds are coated in different layers, respectively, facing each other. Alternatively they are grained individually, mixed and coated in a layer (or the dye releasing redox compound and silver halide grain may be present in the same grain).

Between the interlayer and the dye image-providing compound-containing layer may be provided an insulating layer, as described in U.S. Pat. No. 4,267,250. Also, the interlayer may have incorporated therein a silver halide emulsion, as described in Japanese Patent Application (OPI) No. 67850/81.

EXAMPLE 1

To about 100 g of Polymer I-3 latex having a solid content of 10 wt% with stirring, was added 20 ml of an ethanol solution containing about 1 g of Hydrophobic Substance II-18 at a room temperature in about 30 seconds.

The thus-obtained loaded polymer latex (polymer latex/hydrophobic substance) composition was stable for a long time, and exhibited good compatibility with gelatin.

EXAMPLE 2

To an ethanol solution in which 2.6 g of Hydrophobic Substance II-3 was dissolved was added about 100 g of Polymer I-3 latex having a solid content of 13 wt% with stirring in about 1 minute.

The thus-obtained polymer latex/hydrophobic substance composition was stable for a long time, and exhibited good compatibility with gelatin.

EXAMPLE 3

To about 100 g of Polymer I-19 latex having a solid content of 13 wt% with stirring was added 30 ml of an ethanol solution in which 1.3 g of Hydrophobic Substance II-11 was dissolved at a room temperature in about 30 seconds.

The thus-obtained polymer latex/hydrophobic substance composition was stable for a long time, and exhibited good compatibility with gelatin.

EXAMPLE 4

To about 200 g of Polymer I-20 latex having a solid content of 5 wt% with stirring was added 30 ml of an ethanol solution in which 2 g of Hydrophobic Substance II-9 was dissolved at room temperature in about 30 seconds.

The thus obtained polymer latex/hydrophobic substance composition was stable for a long time, and exhibited good compatibility with gelatin.

EXAMPLE 5

Each of the hydrophobic substances set forth in Table 1 was used for loading according to the process described in Example 1 and then the resulting loaded polymer latex composition was mixed with gelatin. Using the mixture, an image receiving layer having a composition shown below was coated on a transparent polyethylene terephthalate film support and thereon the layers described below were further coated in this order to prepare a light-sensitive sheet.

(1) Image receiving layer containing 3 $g/m^2$ of Polymer I-3, 0.3 $g/m^2$ of a loading hydrophobic substance set forth in Table 1, 3 $g/m^2$ of gelatin and a coating aid of the following formula:

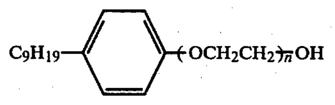

(n = about 30)

(2) White reflecting layer containing 20 $g/m^2$ of titanium dioxide and 2.0 $g/m^2$ of gelatin.

(3) Light-shielding layer containing 2.0 $g/m^2$ of carbon black and 1.5 $g/m^2$ of gelatin.

(4) Layer containing 0.44 $g/m^2$ of a cyan dye releasing redox compound having the following structural formula, 0.09 $g/m^2$ of tricyclohexyl phosphate, 0.008 $g/m^2$ of 2,5-di-t-pentadecylhydroquinone and 0.8 $g/m^2$ of gelatin:

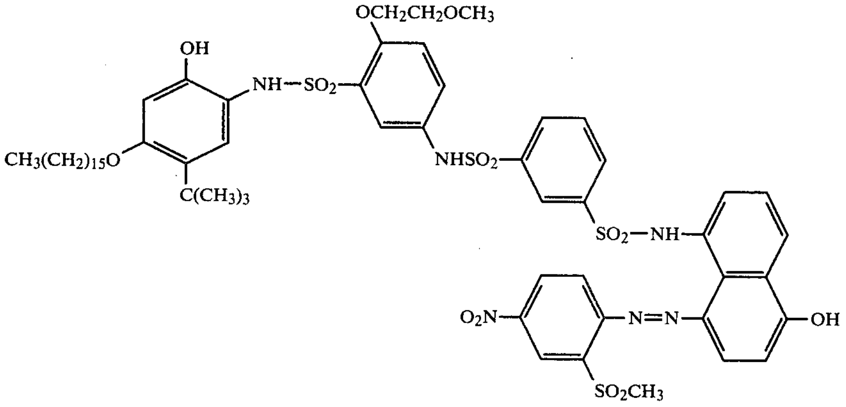

(5) Layer containing a red-sensitive internal latent image type direct positive silver bromide emulsion (1.03 $g/m^2$ based on the amount of silver), 1.2 $g/m^2$ of gelatin, 0.04 $mg/m^2$ of the nucleating agent of the following formula, and 0.13 $g/m^2$ of 2-sulfo-5-n-pentadecylhydroquinone sodium salt:

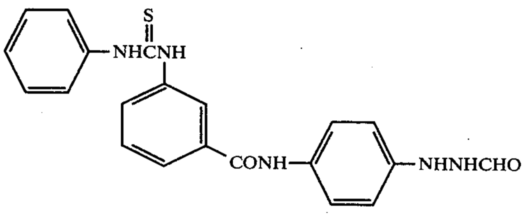

(6) Layer containing 0.43 $g/m^2$ of 2,5-di-t-pentadecylhydroquinone, 0.1 $g/m^2$ of trihexyl phosphate and 0.4 $g/m^2$ of gelatin.

(7) Layer containing 0.21 $g/m^2$ of the magenta dye releasing redox compound of the following structural formula I, 0.11 $g/m^2$ of the other magenta dye releasing redox compound having the following structural formula II, 0.08 $g/m^2$ of tricyclohexyl phosphate, 0.009 $g/m^2$ of 2,5-di-t-pentadecylhydroquinone and 0.9 $g/m^2$ of gelatin:

Formula I

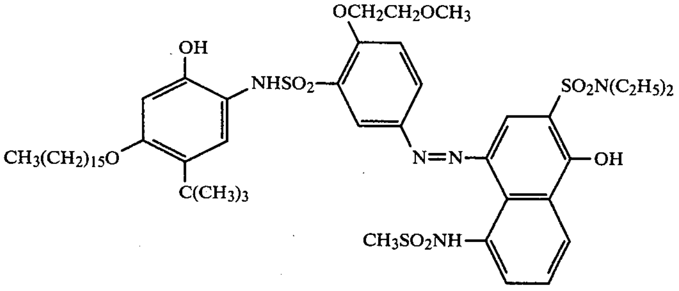

Formula II

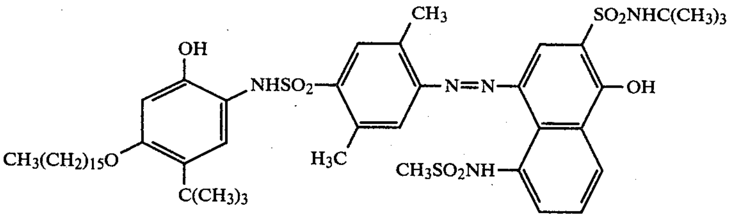

(8) Layer containing a green-sensitive internal latent image type direct positive silver bromide emulsion (containing 0.82 $g/m^2$ of silver), 0.9 $g/m^2$ of gelatin, 0.03 $mg/m^2$ of the same nucleating agent as used in the layer (5), and 0.08 $g/m^2$ of 2-sulfo-5-n-pentadecylhydroquinone sodium salt.

(9) The same layer as the layer (6).

(10) Layer containing 0.53 $g/m^2$ of a yellow dye releasing redox compound having the following structural formula, 0.13 $g/m^2$ of tricyclohexyl phosphate, 0.014 $g/m^2$ of 2,5-di-t-pentadecylhydroquinone and 0.7 $g/m^2$ of gelatin:

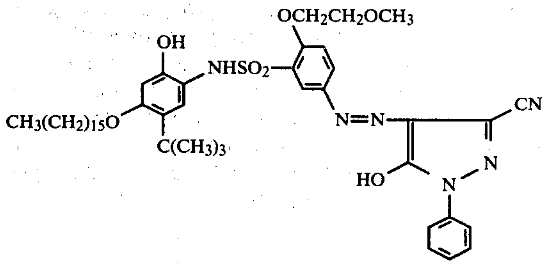

(11) Layer containing a blue-sensitive internal latent image type direct positive silver bromide emulsion (containing 1.09 g/$m^2$ of silver), 1.1 g/$m^2$ of gelatin, 0.04 mg/$m^2$ of the same nucleating agent as used in the layer (5), and 0.07 g/$m^2$ of 2-sulfo-5-n-pentadecylhydroquinone sodium salt.

(12) Layer containing 1.0 g/$m^2$ of gelatin.

A cover sheet was manufactured as follows:

Cover Sheet

On a transparent polyethylene terephthalate film support were coated the layers (1') to (3') described below in this order to prepare a cover sheet.

(1') Lyaer containing 22 g/$m^2$ of an acrylic acid-butylacrylate (80:20, by weight) copolymer, and 0.44 g/$m^2$ of 1,4-bis(2,3-epoxypropoxy)butane.

(2') Layer containing 3.8 g/$m^2$ of such acetyl cellulose as to produce 39.4 g of acetyl group when 100 g of acetyl cellulose is hydrolyzed, 0.23 g/$m^2$ of methanol ringopening products of styrene-maleic anhydride (60:40 by weight) copolymer (molecular weight:about 50,000), and 0.154 g/$m^2$ of 5-(2-cyano-1-methylethylthio)-1-phenyltetrazole.

(3') Layer having a thickness of 2μ prepared by coating a mixture of a styrene-n-butylacrylate-acrylic acid-N-methylolacrylamide (49.7:42.3:3:5, by weight) copolymer latex and a methylmethacrylate-acrylic acid-N-methylolacrylamide (93:4:3, by weight) copolymer latex, in which two latexes are mixed so that a ratio of the solid content of the former latex to that of the latter latex became 6:4 by weight.

The above-described light-sensitive sheet was exposed to light through a color test chart and then the above-described cover sheet was superposed thereon. Therebetween, a processing solution described below was spread in a layer so as to have a thickness of 85μ (the spreading was carried out with the aid of pressure applying rollers). The processing was carried out at a temperature of 25° C. In every light-sensitive sheet, a transferred color image having a good quality was produced, and no reduction of image density, compared with reference samples not containing the hydrophobic substances, was observed.

| Composition of Processing Solution: | | |
|---|---|---|
| 1-p-Tollyl-4-hydroxymethyl-4-methyl-3-pyrazolidone | 6.9 | g |
| Methylhydroquinone | 0.3 | g |
| 5-Methylbenzotriazole | 3.5 | g |
| Sodium Sulfite (anhydrous) | 0.2 | g |
| Sodium Salt of Carboxymethyl Cellulose | 58 | g |
| Potassium Hydroxide (28% aq. soln.) | 200 | cc |
| Benzyl Alcohol | 1.5 | cc |
| Carbon Black | 150 | g |
| Water | 685 | cc |

EXAMPLE 6

Each of the transferred images obtained by the processing in Example 5 was allowed to stand for two weeks under conditions of 40° C. and 30% RH as it was in a monosheet state, and it was completely dried. The dried film unit was illuminated with 3,000 lux of a fluoroescent lamp from the side of the light-sensitive sheet for a period of 2 weeks.

Reductions of image densities of individual film units at the portion having a reflection density of 1.0 before the illumination with light are summarized in Table 1. In every film unit of the present invention, an improvement in light resistance is clearly observed.

TABLE 1

| | Reduction of Density | | |
|---|---|---|---|
| Hydrophobic Substance | Magenta Density | Cyan Density | |
| Not loaded | 0.30 | 0.28 | Comparative Example |
| II-3 | 0.18 | 0.16 | Present Invention |
| II-4 | 0.20 | 0.20 | Present Invention |
| II-14 | 0.18 | 0.20 | Present Invention |
| II-18 | 0.16 | 0.20 | Present Invention |
| II-19 | 0.18 | 0.20 | Present Invention |
| II-24 | 0.14 | 0.20 | Present Invention |

EXAMPLE 7 (Comparison)

Hydrophobic Substance II-18 was dissolved in tricyclohexyl phosphate and ethyl acetate acting as an assistant solvent, and dispersed into a gelatin solution in a form of emulsion. The resulting dispersion was mixed with an aqueous Polymer I-3 latex. Using the thusprepared aqueous polymer latex, an image receiving layer described below, instead of the layer (1) in Example 5, was coated.

(1) Layer containing 3 g/$m^2$ of Polymer I-3 latex, 0.3 g/$m^2$ of Hydrophobic Substance II-18, 0.15 g/$m^2$ of tricyclohexyl phosphate and 3 g/$m^2$ of gelatin.

A light-sensitive sheet having the above-described layer (1) and the same layers (2) to (12) as in Example 5 was prepared, and processed in the same manner as in Example 5. Reductions of maximum reflection densities were measured one hour after the processing. The yellow density was lowered by 0.07, the magenta density was lowered by 0.15, and the cyan density was lowered by 0.20, compared with the results in Example 5. It turns out from the above-described results that the method of the present invention improves light resistance without lowering the maximum densities, and therefore attains the intended purpose.

EXAMPLE 8

Loading of each of hydrophobic substances set forth in Table 2 was carried out using the method described in Example 4. Thereafter, the loaded polymer latex obtained was mixed with gelatin. Using this mixture, an image receiving layer having the following composition was coated on a transparent polyethylene terephthalate film:

(1) Image receiving layer containing 3 g/$m^2$ of Polymer I-20, 0.3 g/$m^2$ of a loading hydrophobic substance set forth in Table 2, 3 g/m[2] of gelatin and a coating aid having the structural formula shown below:

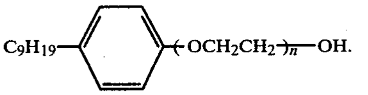
(n = about 30)

Further, the same layers (2) to (12) as in Example 5 were coated on the layer (1) in the same manner as in Example 5 to prepare a light-sensitive sheet. The film unit comprising the thus-prepared light-sensitive sheet was processed in the same manner as in Example 5. One day after the processing, the film unit was illuminated with a 17,000 lux of a fluorescent lamp for a period of two weeks from the side of the light-sensitive sheet. Reductions of reflection density at the portion having a reflection density of 1.0 before the light-illumination are summarized in Table 2.

TABLE 2

| Hydrophobic Substance | Reduction of Density: Magenta Density | Reduction of Density: Cyan Density | |
|---|---|---|---|
| Not loaded | 0.26 | 0.34 | Comparative Example |
| II-9 | 0.12 | 0.18 | Present Invention |
| II-11 | 0.14 | 0.20 | Present Invention |
| II-14 | 0.14 | 0.22 | Present Invention |
| II-18 | 0.14 | 0.20 | Present Invention |
| II-22 | 0.16 | 0.22 | Present Invention |
| II-27 | 0.16 | 0.24 | Present Invention |

In every film unit of the present invention, an improvement in light resistance is clearly observed.

While the invention has been described in detail and with reference to specific embodiments thereof, it will be apparent to one skilled in the art that various changes and modifications can be made therein without departing from the spirit and scope thereof.

What is claimed is:

1. A loaded polymer latex composition comprising an aqueous polymer latex, in a dispersed phase, comprised of a polymer represented by the following general formula (I), said aqueous polymer latex being loaded with a hydrophobic substance represented by the following general formula (II):

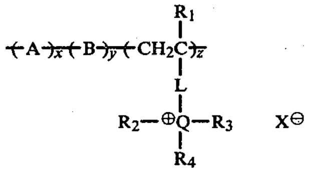
(I)

wherein A represents a constitutional repeating unit derived from a copolymerizable monomer having at least two ethylenic unsaturated groups; B represents a constitutional repeating unit derived from an ethylenic unsaturated monomer which can be copolymerized with monomers giving the unit A and a z-component, respectively; $R_1$ represents a hydrogen atom or a lower alkyl group containing 1 to about 6 carbon atoms; L represents a divalent group containing 1 to about 12 carbon atoms; $R_2$, $R_3$ and $R_4$, which may be the same or different, each represents an alkyl group containing 1 to about 20 carbon atoms or an aralkyl group containing 7 to about 20 carbon atoms, or they may combine with one another and form a ring structure together with Q; Q represents a nitrogen atom or a phosphorus atom; $X^\ominus$ represents an anion; x represents about 0.2 to about 15 mol%; y represents 0 to about 90 mol%; and z represents about 5 to about 99 mol%;

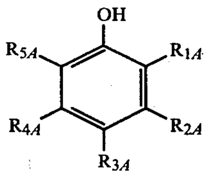
(II)

wherein $R_{1A}$, $R_{2A}$, $R_{3A}$, $R_{4A}$ and $R_{5A}$, which may be the same or different, each represents a hydrogen atom, an alkyl group, an aryl group, an alkenyl group, an aralkyl group, an alkoxy group, an aryloxy group, an alkenoxy group, an aralkoxy group, an alkylthio group, an arylthio group, a halogen atom, a hydroxy group, an amino group, an acylamino group, a diacylamino group, a sulfonamido group, an alkylamino group, a dialkylamino group, an arylamino group, a heterocyclic amino group, a sulfo group, an arylsulfonyl group, an arylsulfinyl group, an acyloxy group, an acyl group, an alkoxycarbonyl group,

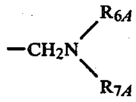 $-(CH_2)_l-R_{8A}$ or 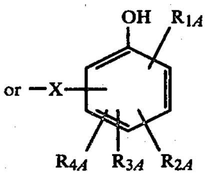 , or $R_{1A}$, $R_{2A}$, $R_{3A}$, $R_{4A}$ and $R_{5A}$ each may form a 5- or 6-membered carbon ring, a chroman ring or a coumaran ring in conjunction with their respective neighboring substituents, wherein $R_{6A}$ and $R_{7A}$ each represents a hydrogen atom, an alkyl group,an aryl group or an aralkyl group, or $R_{6A}$ and $R_{7A}$ may combine with each other to form a 5- or 6-membered ring; $R_{8A}$ represents an alkoxycarbonyl group; X represents a single bond, —S—, —S—S—, —O—, —$CH_2$—S—$CH_2$—, —$CH_2$—O—$CH_2$—, —$SO_2$—, —SO—,

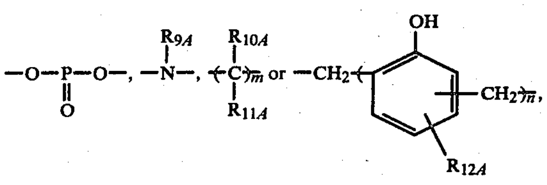

wherein l, m and n each represents an integer of 1 to 3; $R_{9A}$ represents a hydrogen atom, an alkyl group or an aryl group; $R_{10A}$ and $R_{11A}$ each represents a hydrogen atom, an alkyl group or an aryl group, or $R_{10A}$ and $R_{11A}$ may combine with each other to form a 5- or 6-membered ring; and $R_{12A}$ represents a hydrogen atom, an alkyl group or an aryl group.

2. The loaded polymer latex composition as described in claim 1, wherein said z represents 30 to 70 mol%.

3. The loaded polymer latex composition as described in claim 1, wherein said unit A is derived from a compound selected from the group consisting of divinylbenzene and trivinylcyclohexane.

4. The loaded polymer latex composition as described in claim 1, wherein said unit B is derived from a compound selected from the group consisting of styrenes and methacrylic acid esters.

5. The loaded polymer latex composition is described in claim 1, wherein said Q is a nitrogen atom.

6. The loaded polymer latex composition as described in claim 1, wherein said group L is

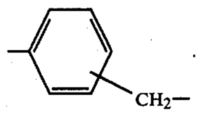

7. The loaded polymer latex composition as described in claim 1, wherein said hydrophobic substance is represented by the following general formula (VI):

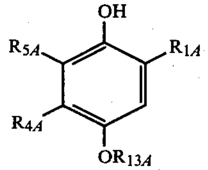

(VI)

wherein $R_{1A}$, $R_{4A}$ and $R_{5A}$ have the same meanings as in the general formula (II) of claim 1, respectively, and $R_{13A}$ represents a hydrogen atom, an alkyl group, an aryl group, an aralkyl group or a terpenyl group.

8. The loaded polymer latex composition as described in claim 1, wherein said hydrophobic substance is represented by the following general formula (VII):

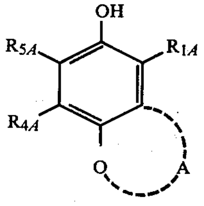

(VII)

wherein $R_{1A}$, $R_{4A}$ and $R_{5A}$ have the same meanings as in the general formula (II) of claim 1, respectively, and A represents non-metal atoms necessary to form a 5- or 6-membered ring.

9. The loaded polymer latex composition as described in claim 1, wherein said hydrophobic substance is represented by the following general formula (VIII):

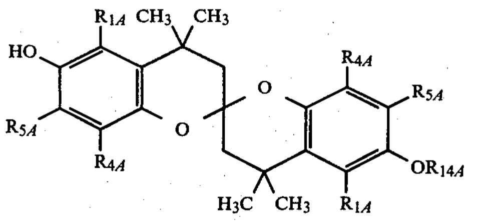

(VIII)

wherein $R_{1A}$, $R_{4A}$ and $R_{5A}$ have the same meanings as in the general formula (II) of claim 1, respectively, and $R_{14A}$ represents a hydrogen atom, an alkyl group, an aryl group, an aralkyl group, an alkenyl group, an acyl group or a sulfonyl group.

10. The loaded polymer latex composition as described in claim 1, wherein said hydrophobic substance is represented by the following general formula (IX):

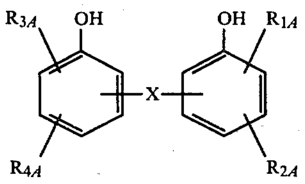

(IX)

wherein $R_{1A}$, $R_{2A}$, $R_{3A}$, $R_{4A}$ and X have the same meanings as in the general formula (II) of claim 1.

11. The loaded polymer latex composition as described in claim 1, wherein said aqueous polymer latex is loaded with 5 to 25% by weight, based on the solid content of the latex, of said hydrophobic substance.

12. A photographic element comprising a support having coated thereon at least one layer containing a dispersion of a mordant polymer represented by the general formula (I), said mordant polymer dispersion being loaded with a hydrophobic substance represented by the general formula (II), the formula (I) being:

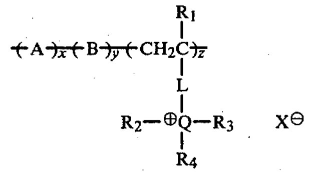

(I)

wherein A represents a constitutional repeating unit derived from a copolymerizable monomer having at least two ethylenic unsaturated groups; B represents a constitutional repeating unit derived from an ethylenic unsaturated monomer which can be copolymerized with monomers giving the unit A and a z-component, respectively; $R_1$ represents a hydrogen atom or a lower alkyl group containing 1 to about 6 carbon atoms; L represents a divalent group containing 1 to about 12 carbon atoms; $R_2$, $R_3$ and $R_4$, which may be the same or different, each represents an alkyl group containing 1 to about 20 carbon atoms or an aralkyl group containing 7 to about 20 carbon atoms, or they may combine with one another and form a ring structure together with Q; Q represents a nitrogen atom or a phosphorus atom; $X^{\ominus}$ represents an anion; x represents about 0.2 to about 15 mol%; y represents 0 to about 90 mol%; and z represents about 5 to about 99 mol%; the formula (II) being:

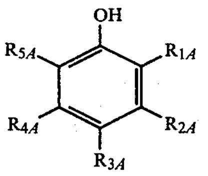

(II)

wherein $R_{1A}$, $R_{2A}$, $R_{3A}$, $R_{4A}$ and $R_{5A}$, which may be the same or different, each represents a hydrogen atom, an alkyl group, an aryl group, an alkenyl group, an aralkyl group, an alkoxy group, an aryloxy group, an alkenoxy group, an aralkoxy group, an alkylthio group, an arylthio group, a halogen atom, a hydroxy group, an amino group, an acylamino group, a diacylamino group, a sulfonamido group, an alkylamino group, a dialkylamino group, an arylamino group, a heterocyclic amino group, a sulfo group, an arylsulfonyl group, an arylsulfinyl group, an acyloxy group, an acyl group, an alkoxycarbonyl group,

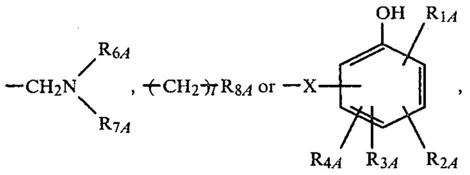

or $R_{1A}$, $R_{2A}$, $R_{3A}$, $R_{4A}$ and $R_{5A}$ each may form a 5- or 6-membered carbon ring, a chroman ring or a coumaran ring in conjunction with their respective neighboring substituents, wherein $R_{6A}$ and $R_{7A}$ each represents a hydrogen atom, an alkyl group, an aryl group or an aralkyl group, or $R_{6A}$ and $R_{7A}$ may combine with each other to form a 5- or 6-membered ring; $R_{8A}$ represents an alkoxycarbonyl group; X represents a single bond, —S—, —S—S—, —O—, —$CH_2$—S—$CH_2$—, —$CH_2$—O—$CH_2$—, —$SO_2$—, —SO—,

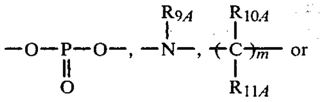

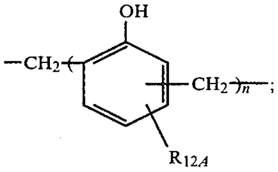

wherein l, m and n each represents an integer of 1 to 3; $R_{9A}$ represents a hydrogen atom, an alkyl group or an aryl group; $R_{10A}$ and $R_{11A}$ each represents a hydrogen atom, an alkyl group or an aryl group, or $R_{10A}$ and $R_{11A}$ may combine with each other to form a 5- or 6-membered ring; and $R_{12A}$ represents a hydrogen atom, an alkyl group or an aryl group.

13. The photographic element as described in claim 12, said element is a photographic element for color diffusion transfer process.

* * * * *